US011312795B2

(12) United States Patent
Friederichs et al.

(10) Patent No.: US 11,312,795 B2
(45) Date of Patent: Apr. 26, 2022

(54) TRANSITION METAL COMPLEX FOR USE IN OR AS A CATALYST FOR OLEFIN POLYMERIZATION

(71) Applicant: SABIC GLOBAL TECHNOLOGIES B.V., Bergen Op Zoom (NL)

(72) Inventors: Nicolaas Hendrika Friederichs, Geleen (NL); Martin Alexander Zuideveld, Geleen (NL); Philip Kenyon, Geleen (NL); Stefan Mecking, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 66 days.

(21) Appl. No.: 16/617,702

(22) PCT Filed: May 18, 2018

(86) PCT No.: PCT/EP2018/063077
§ 371 (c)(1),
(2) Date: Nov. 27, 2019

(87) PCT Pub. No.: WO2018/219690
PCT Pub. Date: Dec. 6, 2018

(65) Prior Publication Data
US 2020/0087425 A1 Mar. 19, 2020

(30) Foreign Application Priority Data
May 28, 2017 (EP) .................................. 17173163

(51) Int. Cl.
*C08F 4/64* (2006.01)
*C08F 110/02* (2006.01)
*C08F 210/02* (2006.01)

(52) U.S. Cl.
CPC ...... *C08F 4/64051* (2013.01); *C08F 4/64044* (2013.01); *C08F 4/64048* (2013.01); *C08F 110/02* (2013.01); *C08F 210/02* (2013.01)

(58) Field of Classification Search
CPC ............. C08F 4/64051; C08F 4/64044; C08F 4/64048
See application file for complete search history.

(56) References Cited

U.S. PATENT DOCUMENTS

| 4,269,749 | A | 5/1981 | Marriott et al. |
| 6,800,699 | B2 | 10/2004 | Schmid et al. |
| 7,129,292 | B1 | 10/2006 | Kristen et al. |
| 7,417,098 | B2 | 8/2008 | Chowdhry et al. |
| 7,566,760 | B2 | 7/2009 | Chowdhry et al. |
| 2002/0099155 | A1 | 7/2002 | Inoue et al. |
| 2003/0114570 | A1 | 6/2003 | Schmid et al. |
| 2014/0228563 | A1* | 8/2014 | Cazin .................. C07D 223/04 540/609 |

FOREIGN PATENT DOCUMENTS

| EP | 0046328 A1 | 2/1982 |
| EP | 0046331 A2 | 2/1982 |
| EP | 0052929 A1 | 6/1982 |
| EP | 0416815 A2 | 3/1991 |
| EP | 0842939 A1 | 5/1998 |
| WO | 9830609 A1 | 7/1998 |
| WO | 9842664 A1 | 10/1998 |
| WO | 2005005496 A2 | 1/2005 |
| WO | 2005090418 A1 | 9/2005 |
| WO | 2007031295 A1 | 3/2007 |
| WO | 2007136493 A2 | 11/2007 |
| WO | 2013154446 A1 | 10/2013 |

OTHER PUBLICATIONS

International Search Report for International Application No. PCT/EP2018/063077, Date of Filing May 18, 2018, dated Sep. 5, 2018, 4 pages.
Written Opinion for International Application No. PCT/EP2018/063077, Date of Filing May 18, 2018, dated Sep. 5, 2018, 5 pages.
Boussie et al., "Nonconventional Catalysts for Isotactic Propene Polymerization in Solution Developed by Using High-Throughput-Screening Technologies", Angew. Chem. Int. Ed. 2006, 45, 3278-3283.
Kemmitt et al., "Reactions of Pentafluorosulphur Chloride and Hydrogen Fluoride with Low Valent Complexes of Some Group VIII Elements: the Preparaion of PtCL(SF5)(PPh3)2", Chemical Communications, 1969, 554.
Osichow et al. "Ideal Polyethylene Nanocrystals", Journal of the American Chemical Society, 2013, 135, 111645-1650.
Philip Kenyon et al: "Pentafluorosulfanyl Substituents in Polymerization Catalysis", Journal of the American Chemical Society, vol. 139, No. 39, Sep. 18, 2017, pp. 13786-13790.
Rastogi et al., "Unprecedented High-Modulus High-Strength Tapes and Films of Ultrahigh Molecular Weight Polyethylene via Solvent-Free Route", Marcomolecules, 2011, 44, 5558-5568.
Scollard et al., "Living Polymerization of a-Olefins by Chelating Diamide Complexes of Titanium", Journal of American Chemical Society, 1996, 118, 10008-10009.
Scollard et al., "Polymerization of a-Olefins by Chelating Diamide Complexes of Titanium", Macromolecules, 1996, 29, 5241-5243.
Shavaleev et al. "Green Phosphorescence and Electroluminescence of Sulfur Pentafluoride-Functionalized Cationic Yidium (III) Complexes", Ingoranic Chemistry, 2015, 54, 5907-5914.
Smith et al., "Drawing of virigin ultrahigh molecular weight polyethylene: an alternative route to high strength/high modulus materials", Journal of Materials Science, 22 (1987) 523-531 pages.

(Continued)

*Primary Examiner* — Catherine S Branch
(74) *Attorney, Agent, or Firm* — Cantor Colburn LLP

(57) ABSTRACT

A catalyst for olefin polymerization containing at least one metal complex comprising at least one —SF$_5$ group attached to a ligand bound to the metal. The invention further relates to catalyst, a process for making polyolefins and dispersions of UHMWPE.

16 Claims, No Drawings

(56) References Cited

OTHER PUBLICATIONS

Tang et al. "Miniemulsion Polymerization—A Comparative Study of Preparative Variables", Journal of Applied Polymer Science, vol. 43, (1991), 1059-1066.
Tchemook et al., "Composites from Aqueous Polyethylene Nanocrystal/Graphene Dispersions", Macromolecules 2014, 47, 3017-3021.
Supporting Information for "New Non-Conventional Catalysts for Isotactic Propene Polymerization in Solution Developed by Using High-Throughput-Screening Technologies", Angew. Chem. Int. Ed. 2006, 37 pages.

* cited by examiner

TRANSITION METAL COMPLEX FOR USE IN OR AS A CATALYST FOR OLEFIN POLYMERIZATION

CROSS REFERENCE TO RELATED APPLICATIONS

This application is a National Stage application of PCT/EP2018/063077, filed May 18, 2018, which claims the benefit of European Application No. 17173163.1, filed May 28, 2017, both of which are incorporated by reference in their entirety herein.

The present invention relates to a process for preparing polymers by polymerizing one or more olefins by a catalyst having a transition metal from groups 3 to 10 of the periodic table of elements, to the catalyst and to products obtained in the polymerization reaction and use of said products.

Catalysts for the polymerization of olefins have been known in the art. Early transition metal catalysts are known since the 60's as Ziegler Natta catalysts. In the 80's, metallocene catalysts have been developed that are also known as single site catalysts. The metallocene, Ziegler-Natta and other early transition metal catalysts have been developed over time in order to increase specific polymerization characteristics like activity, comonomer reactivity, tacticity, molecular weight capability and other important properties that determine the polymer characteristics and/or process parameters of the polymerization processes.

Catalysts having a transition metal from groups 7 to 10 of the periodic table of elements are known in the art. For example, U.S. Pat. No. 7,566,760 discloses Pd or Ni compounds that can polymerize olefins in an aqueous medium. Other examples of publications are U.S. Pat. Nos. 6,800,699, 7,129,292 and 7,417,098.

These publications show catalysts that can produce low to medium molecular weight polyethylene (for example having a Mw of 320.000 g/mol and Mw/Mn of 2,3) with a crystallinity up to 50%.

Polyolefins, especially polyethylene, with very high molecular weight can be used in high demanding applications, for instance in the production of ultra-strong fibers, tapes and articles that require high abrasion and high impact resistance. A polyethylene that is especially suitable for such high demanding applications is UHMwPE. The molecular weight of UHMwPE typically is above Mn of 500.000 g/mol. UHMwPE is an abbreviation for ultra-high molecular weight polyethylene.

A special type of UHMwPE is so-called disentangled UHMwPE as reported for instance by Smith et al in Journal of Material Science 1987, 22, page 523-531 and Rastogi et al in Macromolecules 2011, 44, page 5558-5568. Such disentangled UHMwPE has a lower amount of entanglements between the polymer chains, which makes this polymer have better processing properties compared to typical UHMwPE that contains a high amount of entanglements.

As explained by Rastogi et al., disentangled UHMwPE can be produced for example by using unsupported single site catalysts, whereas heterogeneous Ziegler-type catalysts typically produce polyethylene with a relatively high amount of entanglements. It is well know that when using unsupported catalysts in a polyolefin particle forming process, the process is prone to severe fouling of the polymerization reactor due to the formation of sheets and lumps in the reactor medium as well as on the reactor wall and stirrer.

In the Journal of the American Chemical Society, 2013, vol 135, page 11645-11650, Mecking et al reported that by using specific Ni catalysts in an aqueous dispersion polymerization process carried out at a temperature of 10° C., polyethylene with very high crystallinity can be obtained. The molecular weight, expressed as Mn was 420.000 g/mol. It was shown that the polyethylene produced according to this aqueous dispersion polymerization process using a Ni catalysts was in the form of nearly perfectly crystallized single polymer chains, indicative for a disentangled polyolefin. However, the molecular weight was not high enough for the demanding applications in which UHMwPE is typically used.

There is a need to provide a catalyst that can make higher molecular weight polyolefins, for example having a Mn above 500 000 g/mol, with a good polymerization activity and preferably a high comonomer affinity, Preferably, the polymers are produced without reactor fouling. The polyolefins are preferably in the disentangled state. Optionally the polyolefins contain comonomers that contain polar groups.

Determination of the weight-average molecular weight (Mw) and the number-average molecular weight (Mn) of the polyolefins, particularly the polyethylenes including the UHMwPE according to the present invention may be performed in accordance with the method of ASTM D6474-12.

Metal complexes containing the $SF_5$ group are rare. Although the complex $[PtCl(SF_5)(PPh_3)_2]$ with a metal bound $SF_5$ group has been published by Kemmit and Peacock in the J. Chem. Soc. D 1969, page 554a-554a, there are only few examples of metal complexes utilising this $SF_5$ group.

A notable recent example of metal complexes utilising the $SF_5$ group is published by Shavaleev et al in Inorg. Chem. 2015, 54, 5907-5914. In this publication, cationic iridium complexes with $SF_5$-functionalised ligands are described to study the phosphorescence properties.

Examples of organometallic complexes bearing ligands with $SF_5$ substituents for catalysis are unknown.

The inventors have found that substitution of the aromatic ligands of both early transition metal catalysts and group 7-10 catalysts attached to these catalyst systems with —$SF_5$ groups unexpectedly changes the behavior of the catalysts, improves activity and above all gives a polyethylene having a very high molecular weight.

The invention therefore relates to a transition metal polymerization catalyst comprising at least one —$SF_5$ group attached to a ligand bound to the transition metal.

In a certain embodiment, the invention relates to a catalyst for olefin polymerization containing at least one metal complex comprising at least one —$SF_5$ group attached to a ligand bound to the metal.

In yet another embodiment, the invention relates to a transition metal complex suitable for use in a catalyst for olefin polymerisation wherein the metal complex comprises at least one —$SF_5$ group attached to a ligand bound to the metal.

The present invention has different embodiments.

In one embodiment, the catalyst comprises early transition metals like group 3, 4, 5 or 6 metals. Specific examples of such metals are Ti, Zr or Hf.

Examples of early transition metal complexes are cyclopentadienyl-amido complexes, cyclopentadienyl-phenoxy complexes, ketimide and amidinate complexes, diamido catalysts, imido-amido polyolefin catalysts, pyridyl-amido catalysts and phenoxyimine catalysts.

Examples of cyclopentadienyl-amido complexes can be found in for example EPO 416 815, which is hereby incorporated by reference.

Complexes have been described in EP 0 416 815 according to formula 1

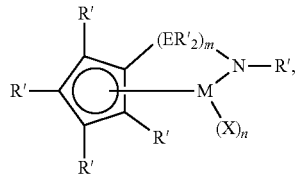

1 wherein:

M is Ti, Zr or Hf bound in an $\eta^5$ bonding mode to the cyclopentadienyl group;

R' each occurrence is hydrogen or a moiety selected from silyl, alkyl, aryl, or combinations thereof having up to 10 carbon or silicon atoms;

E is silicon;

X each occurrence is halo, alkyl, aryl, or alkoxy of up to 10 carbons;

m is 1 or 2; and n is 1 or 2 depending on the valence of M.

An organometallic complex according to formula 1 is part of the present invention when at least one R' is a —$SF_5$ group or a —$SF_5$ group attached to an aromatic carbon ring which is attached to either the cyclopentadienyl ring or the amido group.

Examples of cyclopentadienyl-phenoxy complexes can be found in EP 0 842 939, which is hereby incorporated by reference.

A specific example of a catalyst from EP 0842 939 is a complex according to formula 2

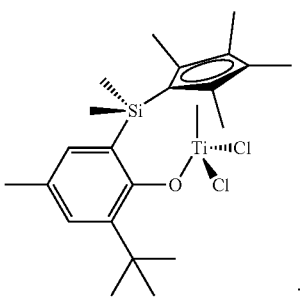

2

This catalyst 2 and its equivalents as disclosed in EP 0842939 can be substituted on the aromatic phenyl ring or cyclopentadienyl group with a —$SF_5$, in order to influence the electronic environment of the Ti atom and thereby the catalytic behavior of the catalyst complex based on this organometallic complex.

Examples of ketimide and amidinate complexes can be found for example in WO2005090418, WO2005005496 and WO2007031295, which are hereby incorporated by reference. Specific examples of ketimide and amidinate complexes are according to formula 3-6.

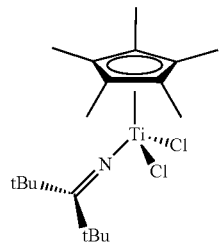

3

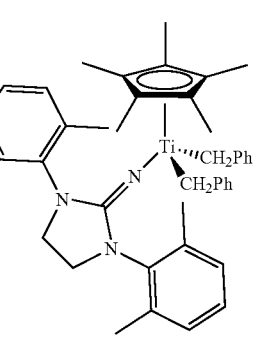

4

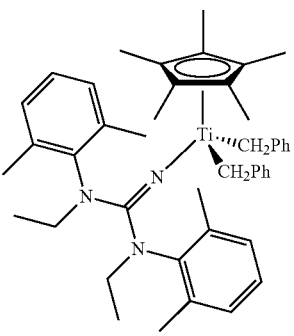

5

6

These structures represent ketimide, amidinate, iminoimidazolidine and guanidinate catalyst precursors.

These catalyst precursors and its equivalents as disclosed in WO2005090418, WO2005005496 and WO2007031295 can be substituted on the aromatic phenyl ring or cyclopentadienyl group with a —$SF_5$ group or an aromatic group containing a —$SF_5$ group, in order to influence the electronic environment of the Ti atom and thereby the catalytic behavior of the catalyst complex based on this organometallic complex.

Examples of diamido catalysts can be found for example in Macromolecules 1996, 29, 5241-5243 and J. Am. Chem. Soc 1996, 118, 10008-10009. Specific examples of diamido catalyst precursors are according to formula 7-9.

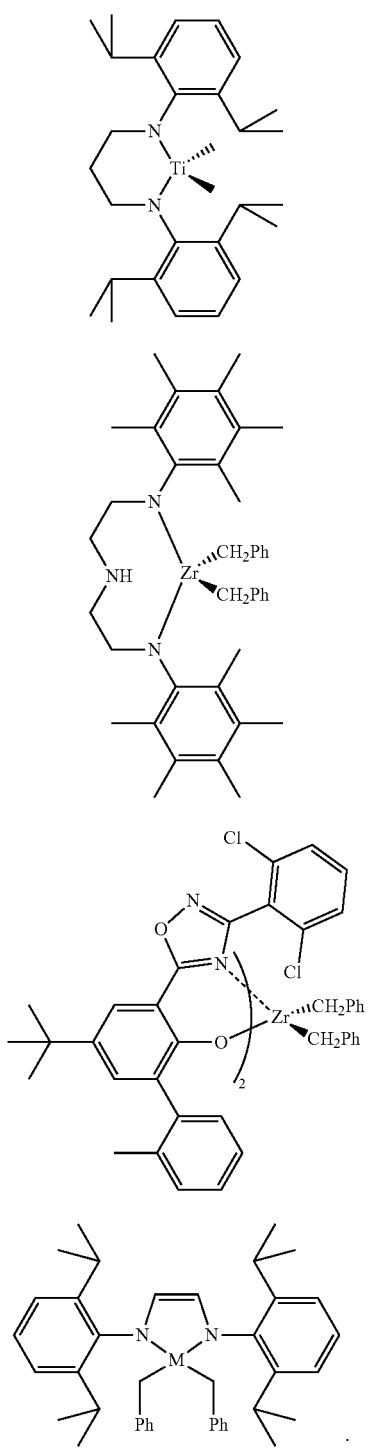

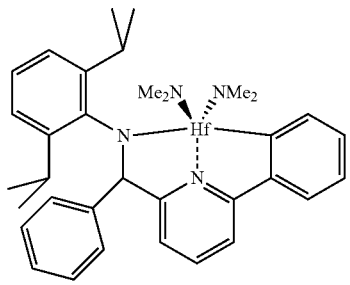

Complex 11 and its equivalents can be substituted with a —SF$_5$ group or an aromatic group containing a —SF$_5$ group.

Another example of suitable catalysts is disclosed for example in WO2007136493. In general catalysts with the structure 11a are defined

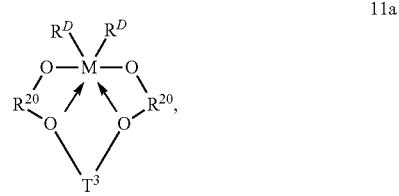

wherein M can be Ti, Zr or Hf, wherein R$^{20}$ independently are a divalent aromatic group containing a —SF$_5$ group, wherein the aromatic group contains between 10 and 30 atoms, not counting hydrogen;

T$^3$ is a divalent hydrocarbon or silane group having from 3 to 20 atoms not counting hydrogen, or an inertly substituted derivative thereof;

R$^D$ is preferably chosen from chloro, methyl or benzyl.

Specific examples of these complexes that can be modified with a —SF$_5$ group are

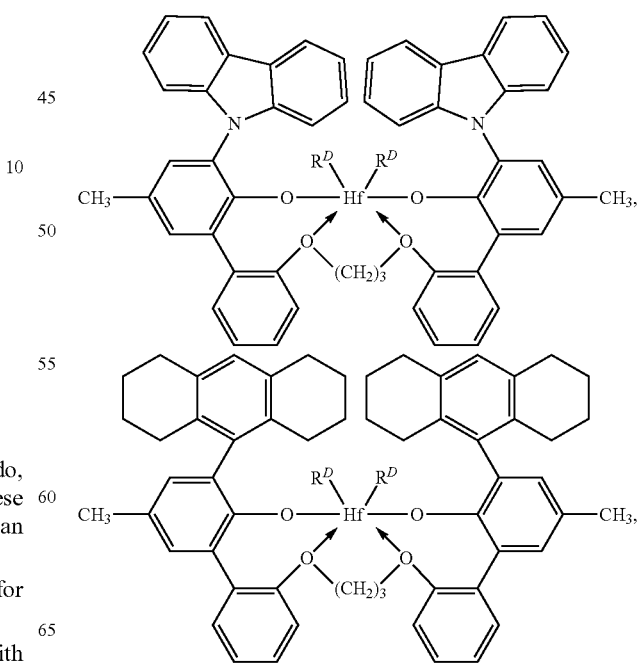

The complexes 7-10 are representatives of diamido, diamido-amine, and oxadiazol complexes. Each of these complexes can be substituted with a —SF$_5$ group or an aromatic group containing a —SF$_5$ group.

Examples of pyridyl-amido catalysts can be found in for example Angew. Chem. 2006, 118, 3356-3361.

A specific example of a complex that can be modified with a —SF$_5$ group is found in formula 11 below.

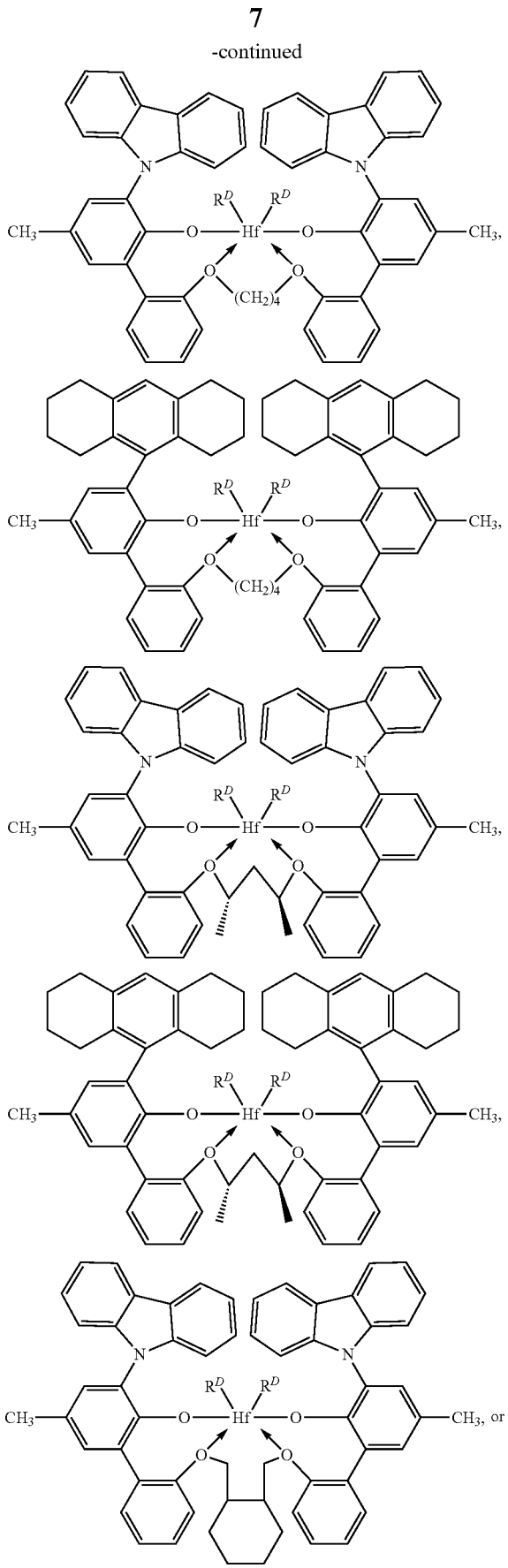

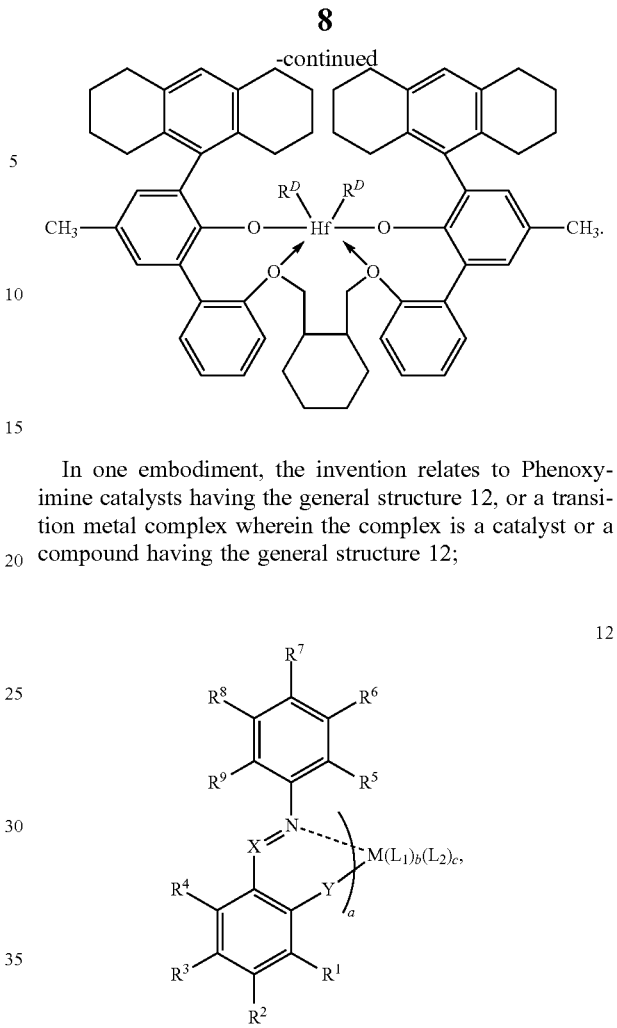

In one embodiment, the invention relates to Phenoxy-imine catalysts having the general structure 12, or a transition metal complex wherein the complex is a catalyst or a compound having the general structure 12;

where the substituents and indices have the following meanings:

M is a transition metal from groups 3 to 10 of the periodic table of the elements, $L_1$ denotes a neutral Lewis base, like for example phosphanes $(R^{19})_x PH_{3-x}$ or amines $(R^{16})_x NH_{3-x}$ with identical or different radicals $R^{16}$, ethers $(R^{16})_2 O$, $H_2O$, alcohols $(R^{16})OH$, pyridine, pyridine derivatives of the formula $C_5H_{5-x}(R^{16})_x N$, CO, $C_1$-$C_{12}$ alkylnitriles, $C_6$-$C_{14}$ arylnitriles or ethylenically unsaturated double bond systems, and wherein x denotes an integer from 0 to 3;

$L_2$ denotes halide ions, amide ions $(R^{16})_h NH_{2-h}$, h denoting an integer from 0 to 2, and also $C_1$-$C_6$ alkyl anions, allyl anions, benzyl anions or aryl anions, it being possible for $L_1$ and $L_2$ to be linked to one another by one or more covalent bonds;

X: is CR or nitrogen atom (N), wherein R is hydrogen, $C_1$-$C_6$ alkyl groups, $C_7$-$C_{13}$ aralkyl radicals or $C_6$-$C_{14}$ aryl groups, unsubstituted or substituted by one or more $C_1$-$C_{12}$ alkyl groups, halogens, mono- or polyhalogenated $C_1$-$C_{12}$ alkyl groups, $C_1$-$C_{12}$ alkoxy groups, silyloxy groups $OSiR^{11}R^{12}R^{13}$, amino groups $NR^{14}R^{15}$ or $C_1$-$C_{12}$ thioether groups;

Y: is OH group, oxygen, sulfur, N—$R^{10}$ or P—$R^{10}$;

a is 1 or 2; b=0 or 1; c=0 or 1, and wherein a+b+c equals the valency of the transition metal M and wherein b+c is 1 or 2;

$R^1$ to $R^9$: are independently of one another hydrogen, $C_1$-$C_{12}$ alkyl, it being possible for the alkyl groups to be branched or unbranched, $C_1$-$C_{12}$ alkyl substituted one or more times by identical or different substituents selected from $C_1$-$C_{12}$ alkyl groups, halogens, $C_1$-$C_{12}$ alkoxy groups and $C_1$-$C_{12}$ thioether groups, $C_7$-$C_{13}$ aralkyl, $C_3$-$C_{12}$ cycloalkyl, $C_3$-$C_{12}$ cycloalkyl substituted one or more times by identical or different substituents selected from $C_1$-$C_{12}$ alkyl groups, halogens, $C_1$-$C_{12}$ alkoxy groups and $C_1$-$C_{12}$ thioether groups, $C_6$-$C_{14}$ aryl, $C_8$-$C_{14}$ aryl substituted by identical or different substituents selected from one or more $C_1$-$C_{12}$ alkyl groups, halogens, mono- or polyhalogenated $C_1$-$C_{12}$ alkyl groups, $C_1$-$C_{12}$ alkoxy groups, silyloxy groups $OSiR^{11}R^{12}R^{13}$, amino groups $NR^{14}R^{15}$ and $C_1$-$C_{12}$ thioether groups, $C_1$-$C_{12}$ alkoxy groups, silyloxy groups $OSiR^{11}R^{12}R^{13}$, halogens, $NO_2$ groups or amino groups $NR^{14}R_{15}$, it being possible in each case for two adjacent radicals $R^1$ to $R^9$ to form with one another a saturated or unsaturated 5- to 8-membered ring;

$R^{10}$ to $R^{16}$ independently of one another are hydrogen, $C_1$-$C_{20}$ alkyl groups, which may be substituted in turn by $O(C_1$-$C_8$ alkyl) or $N(C_1$-$C_6$ alkyl)$_2$ groups, $C_3$-$C_{12}$ cycloalkyl groups, $C_7$-$C_{13}$ aralkyl radicals, $C_7$-$C_{13}$ substituted aralkyl radicals, $C_6$-$C_{14}$ aryl groups or substituted $C_6$-$C_{14}$ aryl groups;

$R^{19}$ can be $C_1$-$C_{20}$ alkyl groups, $C_3$-$C_{12}$ cycloalkyl groups, $C_7$-$C_{13}$ aralkyl radicals, $C_8$-$C_{14}$ aryl groups, which alkyl, cycloalkyl, aralkyl and aryl groups may be substituted in turn by $O(C_1$-$C_6$ alkyl) or $N(C_1$-$C_6$ alkyl)$_2$ groups, sulfonated groups or the salts of sulfonated groups; wherein at least one of the radicals $R^1$ to $R^9$ necessarily being in the form of a —$SF_5$ group or a radical of the formula 14 below

14 where n is an integer from 1 to 5.

For example, in such transition metal complex, the metal M may be an early transition metals from groups 3-6 of the period table, a is 2, indicating that the transition metal comprises 2 ligands. For example, the metal M may be a transition metal from groups 3-6 of the period table and a may be 2.

In a further embodiment, the invention relates to a catalyst having the structure 12 or to a transition metal complex wherein the complex is a catalyst or a compound having the general structure 12:

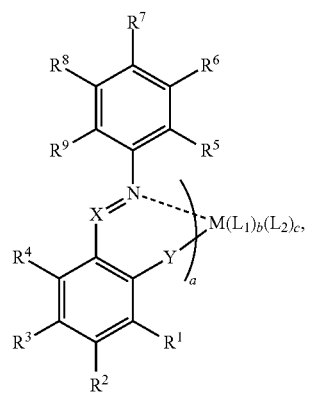

12 wherein the substituents and indices have the following meanings:

M is a transition metal from groups 3 to 10 of the periodic table of the elements;

$L_1$ denotes a neutral Lewis base, like for example phosphanes $(R^{19})_xPH_{3-x}$ or amines $(R^{16})_xNH_{3-x}$ with identical or different radicals $R^{16}$, ethers $(R^{16})_2O$, $H_2O$, alcohols $(R^{16})OH$, pyridine, pyridine derivatives of the formula $C_5H_{5-x}(R^{16}))_xN$, CO, $C_1$-$C_{12}$ alkylnitriles, $C_6$-$C_{14}$ arylnitriles or ethylenically unsaturated double bond systems, and wherein x denotes an integer from 0 to 3;

$L_2$ denotes halide ions, amide ions $(R^{16})_hNH_{2-h}$, h denoting an integer from 0 to 2, and also $C_1$-$C_6$ alkyl anions, allyl anions, benzyl anions or aryl anions, it being possible for $L_1$ and $L_2$ to be linked to one another by one or more covalent bonds;

X is CR or a nitrogen atom (N), wherein R is hydrogen, a $C_1$-$C_6$ alkyl group, a $C_7$-$C_{13}$ aralkyl radical or a $C_6$-$C_{14}$ aryl group, unsubstituted or substituted by one or more $C_1$-$C_{12}$alkyl group(s), halogens, mono- or polyhalogenated $C_1$-$C_{12}$ alkyl groups, $C_1$-$C_{12}$ alkoxy groups, silyloxy groups $OSiR^{11}R^{12}R^{13}$, amino groups $NR^{14}R^{15}$ or $C_1$-$C_{12}$ thioether groups;

Y is an OH group, oxygen, sulfur, N—$R^{10}$ or P—$R^{10}$;

a is 1 or 2; b=0 or 1; c=0 or 1, and wherein a+b+c equals the valence of the transition metal M and wherein b+c is 1 or 2;

$R^1$ to $R^9$: are independently of one another hydrogen, $C_1$-$C_{12}$ alkyl, it being possible for the alkyl groups to be branched or unbranched, $C_1$-$C_{12}$ alkyl substituted one or more times by identical or different substituents selected from $C_1$-$C_{12}$ alkyl groups, halogens, $C_1$-$C_{12}$ alkoxy groups and $C_1$-$C_{12}$ thioether groups, $C_7$-$C_{13}$ aralkyl, $C_3$-$C_{12}$ cycloalkyl, $C_3$-$C_{12}$ cycloalkyl substituted one or more times by identical or different substituents selected from $C_1$-$C_{12}$ alkyl groups, halogens, $C_1$-$C_{12}$ alkoxy groups and $C_1$-$C_{12}$ thioether groups, $C_6$-$C_{14}$ aryl, $C_6$-$C_{14}$ aryl substituted by identical or different substituents selected from one or more $C_1$-$C_{12}$ alkyl groups, halogens, mono- or polyhalogenated $C_1$-$C_{12}$ alkyl groups, $C_1$-$C_{12}$ alkoxy groups, silyloxy groups $OSiR^{11}R^{12}R^{13}$, amino groups $NR^{14}R^{15}$ and $C_1$-$C_{12}$ thioether groups, $C_1$-$C_{12}$ alkoxy groups, silyloxy groups $OSiR^{11}R^{12}R^{13}$, halogens, $NO_2$ groups or amino groups $NR^{14}R_{15}$, it being possible in each case for two adjacent radicals $R^1$ to $R^9$ to form with one another a saturated or unsaturated 5- to 8-membered ring, or an —$SF_5$ group or a radical of the formula 14 below, where n is an integer from 1 to 5;

$R^{10}$ to $R^{16}$ independently of one another are hydrogen, $C_1$-$C_{20}$ alkyl groups, which may be substituted in turn by $O(C_1$-$C_6$ alkyl) or $N(C_1$-$C_6$ alkyl)$_2$ groups, $C_3$-$C_{12}$ cycloalkyl groups, $C_7$-$C_{13}$ aralkyl radicals, $C_7$-$C_{13}$ substituted aralkyl radicals, $C_5$-$C_{14}$ aryl groups or substituted $C_6$-$C_{14}$ aryl groups;

$R^{19}$ can be $C_1$-$C_{20}$ alkyl groups, $C_3$-$C_{12}$ cycloalkyl groups, $C_7$-$C_{13}$ aralkyl radicals, $C_6$-$C_{14}$ aryl groups, which alkyl, cycloalkyl, aralkyl and aryl groups may be substituted in turn by $O(C_1$-$C_6$ alkyl) or $N(C_1$-$C_6$ alkyl)$_2$ groups, sulfonated groups or the salts of sulfonated groups;

wherein at least one of the radicals $R^1$ to $R^9$ necessarily being in the form of an —$SF_5$ group or a radical of the formula 14 below

where n is an integer from 1 to 5.

For early transition metals from groups 3-6 of the period table, a is preferably 2, indicating that the transition metal comprises 2 ligands, while for late transition metals from groups 7-10 preferably a=1, indicating that 1 ligand is present.

Specific examples of suitable complexes for olefin polymerization with early transition metals (preferably Ti) or transition metal complexes according to the invention are;

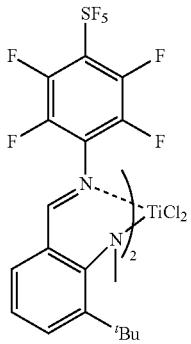

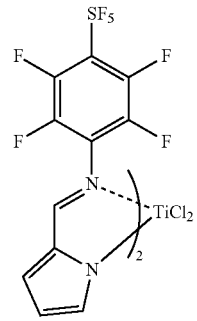

-continued

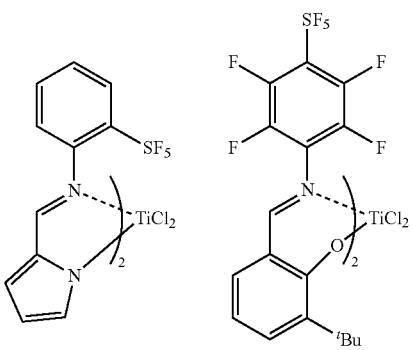

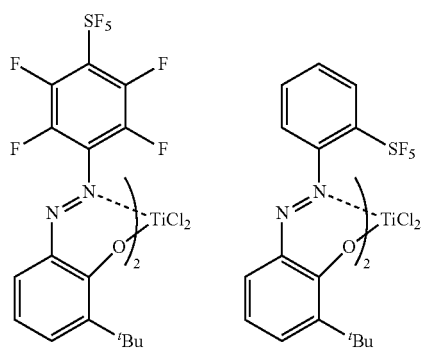

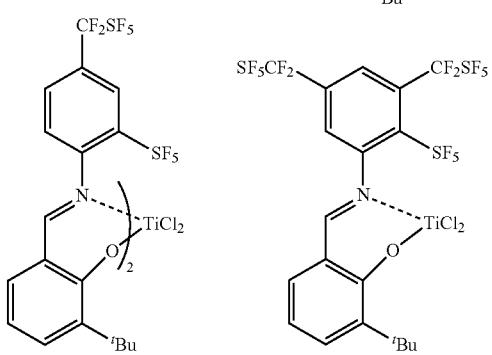

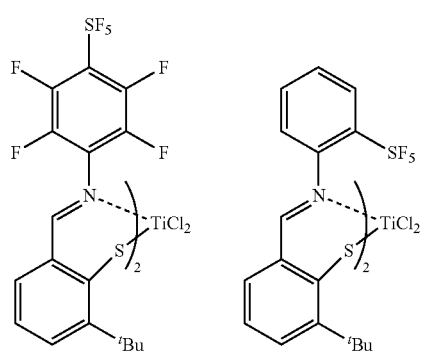

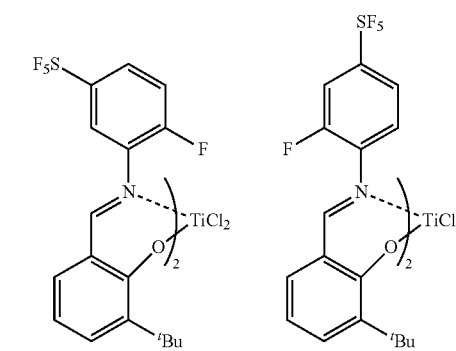

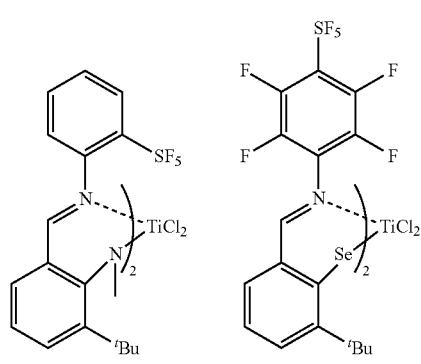

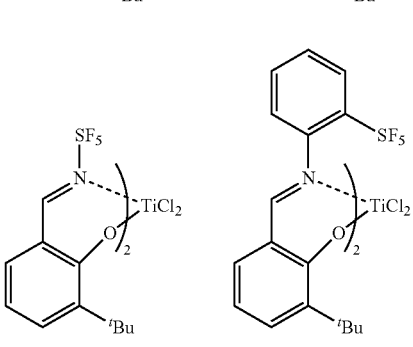

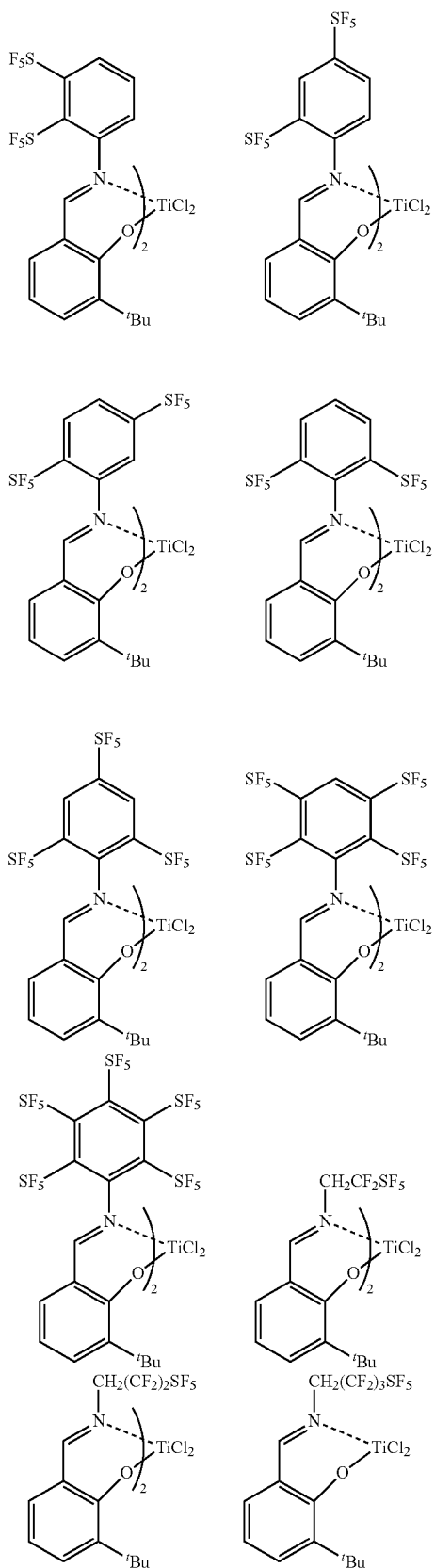
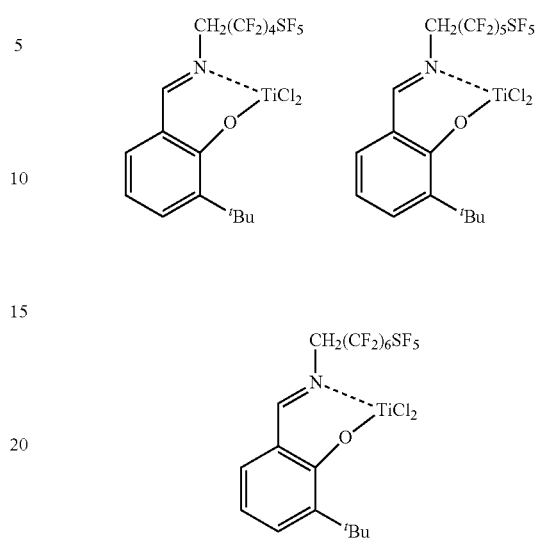

The invention is also directed to a catalyst prepared from the transition metal complex according to the invention and a cocatalyst. In one of its embodiments, the present invention also relates to a catalyst comprising the transition metal complex according to the invention and a optionally cocatalyst. The cocatalyst includes aluminium- or boron-containing cocatalysts. Suitable aluminium-containing cocatalysts comprise aluminoxanes and alkyl aluminium. The aluminoxanes usable according to the present invention are well known and preferably comprise oligomeric linear and/or cyclic alkyl aluminoxanes represented by the formula: $R^{30}$—$(AlR^{30}$—$O)_n$—$AlR^{30}_2$ for oligomeric, linear aluminoxanes and (—$AlR^{30}$—O—)$_m$ for oligomeric, cyclic aluminoxanes; wherein n is 1-40, preferably n is 10-20; m is 3-40, preferably m is 3-20 and $R^{30}$ is a $C_1$ to $C_8$ alkyl group and preferably a methyl group. Further other organoaluminum compounds can be used such as trimethylaluminum, triethylaluminium, triisopropylaluminum, tri-n-propylaluminum, triisobutylaluminum, tri-n-butylaluminum, triamylaluminium; dimethylaluminium ethoxide, diethylaluminium ethoxide, diisopropylaluminium ethoxide, di-n-propylaluminium ethoxide, diisobutylaluminium ethoxide and di-n-butylaluminium ethoxide; dimethylaluminium hydride, diethylaluminium hydride, diisopropylaluminium hydride, di-n-propylaluminium hydride, diisobutylaluminium hydride and di-n-butylaluminium hydride.

Suitable boron-containing cocatalysts include trialkylboranes, for example trimethylborane or triethylborane and/or tris(perfluorophenyl)borane and/or tetrakis(perfluorophenyl)borate compound.

In one embodiment of the invention the boron containing cocatalysts can also comprise a $SF_5$ group.

In one embodiment the catalyst comprises a metal from group 7-10, wherein a=1, b=1 and c=1.

The invention therefore also relates to a catalyst or a transition metal complex according to formula 13

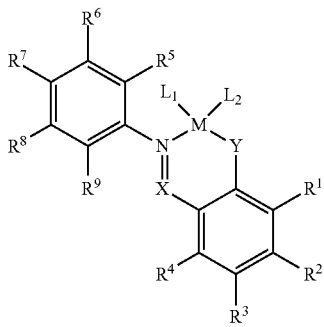

13 where the substituents and indices have the following meanings:

M is a transition metal from groups 7 to 10 of the periodic table of the elements;

$L_1$ denotes a neutral Lewis base, like for example phosphanes $(R^{19})_x PH_{3-x}$ or amines $(R^{16})_x NH_{3-x}$ with identical or different radicals $R^{16}$, ethers $(R^{16})_2 O$, $H_2O$, alcohols $(R^{18})$OH, pyridine, pyridine derivatives of the formula $C_5H_{5-x}(R^{16})_x N$, CO, $C_1$-$C_{12}$ alkylnitriles, $C_6$-$C_{14}$ arylnitriles or ethylenically unsaturated double bond systems;

x denoting an integer from 0 to 3;

$L_2$ denotes halide ions, amide ions $(R^{16})_n NH_{2-h}$, h denoting an integer from 0 to 2, and also $C_1$-$C_6$ alkyl anions, allyl anions, benzyl anions or aryl anions, it being possible for $L_1$ and $L_2$ to be linked to one another by one or more covalent bonds;

X: is CR or nitrogen atom (N), R is hydrogen, $C_1$-$C_6$ alkyl groups, $C_1$-$C_{13}$ aralkyl radicals or $C_6$-$C_{14}$ aryl groups, unsubstituted or substituted by one or more $C_1$-$C_{12}$ alkyl groups, halogens, mono- or polyhalogenated $C_1$-$C_{12}$ alkyl groups, $C_1$-$C_{12}$ alkoxy groups, silyloxy groups $OSiR^{11}R^{12}R^{13}$, amino groups $NR^{14}R^{15}$ or $C_1$-$C_{12}$ thioether groups;

Y: is OH group, oxygen, sulfur, N—$R^{10}$ or P—$R^{10}$;

N: is nitrogen atom;

$R^1$ to $R^9$: are independently of one another hydrogen, $C_1$-$C_{12}$ alkyl, it being possible for the alkyl groups to be branched or unbranched, $C_1$-$C_{12}$ alkyl substituted one or more times by identical or different substituents selected from $C_1$-$C_{12}$ alkyl groups, halogens, $C_1$-$C_{12}$ alkoxy groups and $C_1$-$C_{12}$ thioether groups, $C_7$-$C_{13}$ aralkyl, $C_3$-$C_{12}$ cycloalkyl, $C_3$-$C_{12}$ cycloalkyl substituted one or more times by identical or different substituents selected from $C_1$-$C_{12}$ alkyl groups, halogens, $C_1$-$C_{12}$ alkoxy groups and $C_1$-$C_{12}$ thioether groups, $C_6$-$C_{14}$ aryl, $C_6$-$C_{14}$ aryl substituted by identical or different substituents selected from one or more $C_1$-$C_{12}$ alkyl groups, halogens, mono- or polyhalogenated $C_1$-$C_{12}$ alkyl groups, $C_1$-$C_{12}$ alkoxy groups, silyloxy groups $OSiR^{11}R^{12}R^{13}$, amino groups $NR^{14}R^{15}$ and $C_1$-$C_{12}$ thioether groups, $C_1$-$C_{12}$ alkoxy groups, silyloxy groups $OSiR^{11}R^{12}R^{13}$, halogens, $NO_2$ groups or amino groups $NR^{14}R_{15}$, it being possible in each case for two adjacent radicals $R^1$ to $R^9$ to form with one another a saturated or unsaturated 5- to 8-membered ring;

$R^{10}$ to $R^{16}$ independently of one another are hydrogen, $C_1$-$C_{20}$ alkyl groups, which may be substituted in turn by $O(C_1$-$C_6$ alkyl) or $N(C_1$-$C_6$ alkyl)$_2$ groups, $C_3$-$C_{12}$ cycloalkyl groups, $C_7$-$C_{13}$ aralkyl radicals, $C_7$-$C_{13}$ substituted aralkyl radicals, $C_6$-$C_{14}$ aryl groups or substituted $C_8$-$C_{14}$ aryl groups;

$R^{19}$ can be $C_1$-$C_{20}$ alkyl groups, which may be substituted in turn by $O(C_1$-$C_6$ alkyl) or $N(C_1$-$C_6$ alkyl)$_2$ groups, $C_3$-$C_{12}$ cycloalkyl groups, $C_7$-$C_{13}$ aralkyl radicals, $C_7$-$C_{13}$ substituted aralkyl radicals, $C_6$-$C_{14}$ aryl groups, substituted $C_6$-$C_{14}$ aryl groups like for example sulfonated aryl groups or the salts of sulfonated arylgroups;

wherein at least one of the radicals $R^1$ to $R^9$ being in the form of a —$SF_5$ group or a radical of the formula 14 below

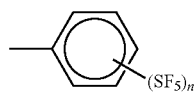

14 where n is an integer from 1 to 5.

The invention therefore also relates to a catalyst according to formula 13

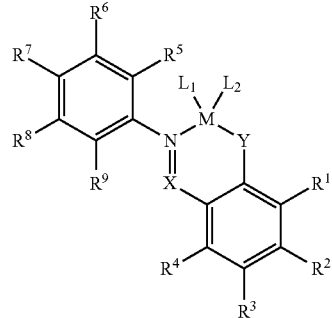

13 where the substituents and indices have the following meanings:

M is a transition metal from groups 7 to 10 of the periodic table of the elements;

$L_1$ denotes a neutral Lewis base, like for example phosphanes $(R^{19})_x PH_{3-x}$ or amines $(R^{16})_x NH_{3-x}$ with identical or different radicals $R^{16}$, ethers $(R^{19})_2 O$, $H_2O$, alcohols $(R^{16})$OH, pyridine, pyridine derivatives of the formula $C_5H_{5-x}(R^{16})_x N$, CO, $C_1$-$C_{12}$ alkylnitriles, $C_6$-$C_{14}$ arylnitriles or ethylenically unsaturated double bond systems; x denoting an integer from 0 to 3;

$L_2$ denotes halide ions, amide ions $(R^{16})_n NH_{2-h}$, h denoting an integer from 0 to 2, and also $C_1$-$C_6$ alkyl anions, allyl anions, benzyl anions or aryl anions, it being possible for $L_1$ and $L_2$ to be linked to one another by one or more covalent bonds;

X: is CR or a nitrogen atom (N), R is hydrogen, a $C_1$-$C_6$ alkyl group, a $C_7$-$C_{13}$ aralkyl radical or a $C_6$-$C_{14}$ aryl group, unsubstituted or substituted by one or more $C_1$-$C_{12}$ alkyl groups, halogens, mono- or polyhalogenated $C_1$-$C_{12}$ alkyl groups, $C_1$-$C_{12}$ alkoxy groups, silyloxy groups $OSiR^{11}R^{12}R^{13}$, amino groups $NR^{14}R^{15}$ or $C_1$-$C_{12}$ thioether groups;

Y: is OH group, oxygen, sulfur, N—$R^{10}$ or P—$R^{10}$;

$R^1$ to $R^9$ are independently of one another:
hydrogen;
$C_1$-$C_{12}$ alkyl, it being possible for the alkyl groups to be branched or unbranched, $C_1$-$C_{12}$ alkyl substituted one or more times by identical or different substituents selected from $C_1$-$C_{12}$ alkyl groups, halogens, $C_1$-$C_{12}$ alkoxy groups and $C_1$-$C_{12}$ thioether groups;
$C_7$-$C_{13}$ aralkyl;

$C_3$-$C_{12}$ cycloalkyl;

$C_3$-$C_{12}$ cycloalkyl substituted one or more times by identical or different substituents selected from $C_1$-$C_{12}$ alkyl groups, halogens, $C_1$-$C_{12}$ alkoxy groups and $C_1$-$C_{12}$ thioether groups;

$C_6$-$C_{14}$ aryl, optionally substituted by identical or different substituents selected from one or more $C_1$-$C_{12}$ alkyl groups, halogens, mono- or polyhalogenated $C_1$-$C_{12}$ alkyl groups, $C_1$-$C_{12}$ alkoxy groups, silyloxy groups $OSiR^{11}R^{12}R^{13}$, amino groups $NR^{14}R^{15}$ and $C_1$-$C_{12}$ thioether groups;

$C_1$-$C_{12}$ alkoxy groups;

silyloxy groups $OSiR^{11}R^{12}R^{13}$;

halogens;

$NO_2$ groups or amino groups $NR^{14}R^{15}$; or

—$SF_5$ groups or radicals of the formula 14 below, where n is and integer from 1 to 5;

it being possible in each case for two adjacent radicals $R^1$ to $R^9$ to form with one another a saturated or unsaturated 5- to 8-membered ring;

$R^{19}$ to $R^{16}$ independently of one another are hydrogen, $C_1$-$C_{20}$ alkyl groups, which may be substituted in turn by $O(C_1$-$C_6$ alkyl$)$ or $N(C_1$-$C_6$ alkyl$)_2$ groups, $C_3$-$C_{12}$ cycloalkyl groups, $C_7$-$C_{13}$ aralkyl radicals, $C_7$-$C_{13}$ substituted aralkyl radicals, $C_6$-$C_{14}$ aryl groups or substituted $C_6$-$C_{14}$ aryl groups;

$R^{19}$ can be $C_1$-$C_{20}$ alkyl groups, which may be substituted in turn by $O(C_1$-$C_6$ alkyl$)$ or $N(C_1$-$C_6$ alkyl$)_2$ groups, $C_3$-$C_{12}$ cycloalkyl groups, $C_7$-$C_{13}$ aralkyl radicals, $C_7$-$C_{13}$ substituted aralkyl radicals, $C_6$-$C_{14}$ aryl groups, substituted $C_6$-$C_{14}$ aryl groups like for example sulfonated aryl groups or the salts of sulfonated aryl-groups;

wherein at least one of the radicals $R^1$ to $R^9$ being in the form of an —$SF_5$ group or a radical of the formula 14 below

14 where n is an integer from 1 to 5.

The invention also relates to a process for the (co) polymerization of olefinic monomers by polymerizing one or more olefinic monomers in the presence of the above catalyst. The polymerization can be carried out in an organic medium, like for example butane, hexane, heptane, toluene, or in an aqueous environment.

Olefins suitable for the process of the invention for the preparation of homopolymers include: ethylene, propylene, 1-butene, 1-pentene, 1-hexene, 1-heptene, 1-octene, 1-decene, and 1-eicosene, but also branched olefins such as 4-methyl-1-pentene, norbornene, vinylcyclohexene, and vinylcyclohexane, and also styrene, para-methylstyrene, and para-vinylpyridine, preference being given to ethylene and propylene. Ethylene is particularly preferred.

The copolymerization of two or more olefins is also possible with the process of the invention. The olefins used in such copolymerization being selectable from the groups of apolar 1-olefins, such as ethylene, propylene, 1-butene, 1-pentene, 1-hexene, 1-heptene, 1-octene, 1-decene, and 1-eicosene, but also branched olefins, such as 4-methyl-1-pentene, vinylcyclohexene, vinylcyclohexane, and also styrene, para-methylstyrene, and para-vinylpyridine, preference being given to ethylene, propylene, 1-butene, 1-pentene, 1-hexene, 1-heptene, 1-octene, and 1-decene. For transition metal complexes from group 7-10, also polymerization of olefins containing polar groups are possible, such as acrylic acid, acrylic acid $C_1$-$C_8$ alkyl esters, 2-hydroxyethyl acrylate, 3-hydroxypropyl acrylate, 4-hydroxybutyl acrylate, methacrylic acid, methacrylic acid $C_1$-$C_8$ alkyl esters, $C_4$-$C_6$ alkyl vinyl ethers and vinyl acetate, but also 10-undecenoic acid, 3-butenoic acid, 4-pentenoic acid, 5-hexenoic acid, and also styrene-4-sulfonic acid. Preference is given to acrylic acid, methyl acrylate, ethyl acrylate, n-butyl acrylate, 2-ethylhexyl acrylate, 2-hydroxyethyl acrylate, methyl methacrylate, ethyl methacrylate, n-butyl methacrylate, ethyl vinyl ether, vinyl acetate, 10-undecenoic acid, 3-butenoic acid, 4-pentenoic acid, and 5-hexenoic acid.

The fraction of specific monomers in the olefin mixture to be co-polymerized is freely selectable and is normally <99% by weight, frequently <50% by weight, and often ≤30% by weight or ≤20% by weight. Where olefins containing polar groups in particular are used for the copolymerization, their fraction in the olefin mixture to be polymerized is generally ≤0.1% by weight, ≤0.2% by weight or ≤0.5% by weight and ≤20% by weight, ≤50% by weight or ≤99% by weight.

It is preferred to use exclusively ethylene. Where at least two olefins are used for the polymerization, they are frequently selected from the group consisting of ethylene, propylene, 1-butene, 1-hexene, and styrene. It is common to use ethylene in combination with propylene, 1-butene, 1-hexene or styrene.

In the metal complex compounds of the formula 13 the radicals are defined as follows.

M is a transition metal from groups 7 to 10 of the periodic table of the elements, preferably manganese, iron, cobalt, nickel or palladium, and with particular preference nickel or palladium.

The Lewis base $L_1$ is selected from phosphanes of the formula $(R^{19})_xPH_{3-x}$ or amines of the formula $(R^{16})_xNH_{3-x}$, x being an integer between 0 and 3. However, ethers $(R^6)_2O$ such as diethyl ether or tetrahydrofuran, $H_2O$, alcohols $(R^{16})OH$ such as methanol or ethanol, pyridine, pyridine derivatives of the formula $C_5H_{5-x}(R^{16})_xN$, such as 2-picoline, 3-picoline, 4-picoline, 2,3-lutidine, 2,4-lutidine, 2,5-lutidine, 2,6-lutidine or 3,5-lutidine, CO, $C_1$-$C_{12}$ alkylnitriles or $C_5$-$C_{14}$ arylnitriles are also suitable, such as acetonitrile, propionitrile, butyronitrile or benzonitrile. Furthermore, mono- or polyethylenically unsaturated double bond systems may serve as ligands.

$L_2$ is selected from halide ions, such as fluoride, chloride, bromide or iodide, preferably chloride or bromide, amide ions $(R^{18})_hNH_{2-h}$, h denoting an integer between 0 and 2, $C_1$-$C_6$ alkyl anions such as $Me^-$, $(C_2H_5)^-$, $(C_3H_7)^-$, $(n$-$C_4H_9)^-$, $(tert$-$C_4H_9)^-$ or $(C_6H_{13})^-$, allyl anions or methallyl anions, benzyl anions or aryl-anions, such as $(C_6H_5)^-$.

In one particular embodiment $L_1$ and $L_2$ are linked to one another by one or more covalent bonds. Examples of such ligands are 1,5-cyclooctadienyl ligands ("COD"), cyclooct-1-en-4-yl, 1,6-cyclodecenyl ligands or 1,5,9-all-trans-cyclododecatrienyl ligands.

In another particular embodiment $L_1$ is tetramethylethylenediamine, in which case only one nitrogen coordinates with the metal. X denotes radicals of the formula CR or a nitrogen atom (N), in particular radicals of the formula CR, where R is hydrogen, $C_1$-$C_6$ alkyl groups, $C_7$-$C_{13}$ aralkyl radicals or $C_6$-$C_{14}$ aryl groups, unsubstituted or substituted by one or more $C_1$-$C_{12}$ alkyl groups, halogens, mono- or polyhalogenated $C_1$-$C_{12}$ alkyl groups, $C_1$-$C_{12}$ alkoxy groups, silyloxy groups $OSiR^{11}R^{12}R^{13}$, amino groups $NR^{14}R^{15}$ or $C_1$-$C_{12}$ thioether groups.

Examples of particularly preferred radicals R in the formula CR can be found in connection with the description of the radicals $R^1$ to $R^9$, V is an OH group, oxygen, sulfur, N—$R^{10}$ or P—$R^{10}$, particular preference being given to the OH group and to oxygen. N is a nitrogen atom.

The radicals $R^1$ to $R^9$ are selected independently of one another from hydrogen, $C_1$-$C_{12}$ alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl, and n-dodecyl; preferably $C_1$-$C_6$ alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, with particular preference $C_1$-$C_4$ alkyl, such as methyl, ethyl, n-propyl, isopropyl, n-butyl, isobutyl, sec-butyl and tert-butyl, $C_1$-$C_{12}$ alkyl substituted one or more times by identical or different substituents selected from $C_1$-$C_{12}$ alkyl groups, halogens, such as fluorine, chlorine, bromine and iodine, preferably chlorine and bromine, and $C_1$-$C_{12}$ alkoxy groups or $C_1$-$C_{12}$ thioether groups, the alkyl groups of these two groups being defined below, $C_7$-$C_{13}$ aralkyl, such as benzyl, 1-phenethyl, 2-phenethyl, 1-phenylpropyl, 2-phenylpropyl, 3-phenylpropyl, neophyl (1-methyl-1-phenylethyl), 1-phenylbutyl, 2-phenylbutyl, 3-phenylbutyl and 4-phenylbutyl, with particular preference benzyl, $C_3$-$C_{12}$ cycloalkyl, such as cyclopropyl, cyclobutyl, cyclopentyl, cyclohexyl, cycloheptyl, cyclooctyl, cyclononyl, cyclodecyl, cycloundecyl and cyclododecyl, preferably cyclopentyl, cyclohexyl and cycloheptyl, $C_3$-$C_{12}$ cycloalkyl substituted one or more times by identical or different substituents selected from $C_1$-$C_{12}$ alkyl groups, halogens, $C_1$-$C_{12}$ alkoxy groups, and $C_1$-$C_{12}$ thioether groups, such as 2-methylcyclopentyl, 3-methylcyclopentyl, cis-2,4-dimethylcyclopentyl, trans-2,4-dimethylcyclopentyl 2,2,4,4-tetramethylcyclopentyl, 2-methylcyclohexyl, 3-methylcyclohexyl, 4-methylcyclohexyl, cis-2,5-dimethylcyclohexyl, trans-2,5-dimethylcyclohexyl, 2,2,5,5-tetramethylcyclohexyl, 2-methoxycyclopentyl, 2-methoxycyclohexyl, 3-methoxycyclopentyl, 3-methoxycyclohexyl, 2-chlorocyclopentyl, 3-chlorocyclopentyl, 2,4-dichlorocyclopentyl, 2,2,4,4-tetrachlorocyclopentyl, 2-chlorocyclohexyl, 3-chlorocyclohexyl, 4-chlorocyclohexyl, 2,5-dichlorocyclohexyl, 2,2,5,5-tetrachlorocyclohexyl, 2-thiomethylcyclopentyl, 2-thiomethylcyclohexyl, 3-thiomethylcyclopentyl, 3-thiomethylcyclohexyl, and further derivatives, $C_6$-$C_{14}$ aryl, such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, substituted in turn by one or more $C_1$-$C_{12}$ alkyl groups, as defined above, halogens, as defined above, mono- or polyhalogenated $C_1$-$C_{12}$ alkyl groups, such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, preferably fluoromethyl, difluoromethyl, trifluoromethyl and perfluorobutyl, $C_1$-$C_{12}$ alkoxy groups, preferably $C_1$-$C_5$ alkoxy groups, such as methoxy, ethoxy, n-propoxy, isopropoxy, n-butoxy, isobutoxy, sec-butoxy, tert-butoxy, n-pentoxy, isopentoxy, n-hexoxy and isohexoxy, with particular preference methoxy, ethoxy, n-propoxy and n-butoxy, silyloxy groups $OSiR^{11}R^{12}R^{13}$, $R^{11}$ to $R^{13}$ independently of one another being hydrogen, $C_1$-$C_{20}$ alkyl groups, which may in turn be substituted by $O(C_1$-$C_6$ alkyl) or $N(C_1$-$C_6$ alkyl)$_2$ groups, $C_3$-$C_{12}$ cycloalkyl groups, $C_7$-$C_{13}$ aralkyl radicals or $C_6$-$C_{14}$ aryl groups, such as the trimethylsilyloxy, triethylsilyloxy, triisopropylsilyloxy, diethylisopropylsilyloxy, dimethylthexylsilyloxy, tert-butyldimethylsilyloxy, tert-butyldiphenylsilyloxy, tribenzylsilyloxy, triphenylsilyloxy and the tri-para-xylylsilyloxy groups; particular preference is given to the trimethylsilyloxy group and the tert-butyldimethylsilyloxy group, amino groups $NR^{14}R^{15}$, $R^{14}$ and $R^{15}$ independently of one another being hydrogen, $C_1$-$C_{20}$ alkyl groups, which may be substituted in turn by $O(C_1$-$C_6$ alkyl) or $N(C_1$-$C_6$ alkyl)$_2$ groups, $C_3$-$C_{12}$ cycloalkyl groups, $C_7$-$C_{13}$ aralkyl radicals or $C_6$-$C_{14}$ aryl groups, it being possible for $R^{14}$ and $R^{15}$ to form a saturated or unsaturated 5- to 8-membered ring, such as dimethylamino, diethylamino, diisopropylamino, methylphenylamino, diphenylamino, N-piperidyl, N-pyrrolidinyl, N-pyrryl, N-indolyl or N-carbazolyl; or $C_1$-$C_{12}$ thioether groups, as defined above, $C_1C_{12}$ alkoxy groups, as defined above, preferably $C_1$-$C_6$ alkoxy groups, such as methoxy, ethoxy, n-propoxy, isopropoxy, n-butoxy, isobutoxy, sec-butoxy, tert-butoxy, n-pentoxy, isopentoxy, n-hexoxy and isohexoxy, with particular preference methoxy, ethoxy, n-propoxy and n-butoxy, silyloxy groups $OSiR^{11}R^{12}R^{13}$, as defined above, halogens, as defined above, or amino groups $NR^{14}R^{15}$, as defined above, or $NO_2$ groups, it being possible in each case for two adjacent radicals $R^1$ to $R^9$ to form with one another a saturated or unsaturated 5- to 8-membered ring which is aromatic or aliphatic, such as —$(CH_2)_3$— (trimethylene), —$(CH_2)_4$— (tetramethylene), —$(CH_2)_5$— (pentamethylene), —$(CH_2)_6$— (hexamethylene), —$CH_2$—CH=CH—, —$CH_2$—CH=CH—$CH_2$—, —CH=CH—CH=CH—, —O—$CH_2$—O—, —O—CHMe-O—, —CH—$(C_6H_5)$—O—, —O—$CH_2$—$CH_2$—O—, —O—$CMe_2$-O—, —NMe-$CH_2$—$CH_2$—NMe-, —NMe-$CH_2$—NMe- or —O—$SiMe_2$-O—.

$R^{10}$ to $R^{16}$ independently of one another are: hydrogen, $C_1$-$C_{20}$ alkyl groups, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-octyl, n-nonyl, isononyl, n-decyl, isodecyl, n-undecyl, isoundecyl, n-dodecyl, isododecyl, n-tetradecyl, n-hexadecyl, n-octadecyl and n-eicosyl; with particular preference $C_1$-$C_4$ alkyl such as methyl, ethyl, n-propyl, isopropyl, n-butyl, isobutyl, sec-butyl and tert-butyl, $C_1$-$C_{20}$ alkyl groups substituted by $O(C_1$-$C_6$ alkyl) or $N(C_1$-$C_6$ alkyl)$_2$ radicals, such as $CH_2$—$CH_2$—$OCH_3$ or $CH_2$—$CH_2$—$N(CH_3)_2$, $C_3$-$C_{12}$ cycloalkyl, as defined above, $C_7$-$C_{13}$ aralkyl radicals; as defined above, $C_6$-$C_{14}$ aryl groups, as defined above, substituted $C_6$-$C_{14}$ aryl groups, like for example sulfonic acid or sodium sulfonic acid substituted phenyl group, it being possible in each case for two adjacent radicals $R^{10}$ to $R^{15}$ together with the relevant heteroatom to form a saturated or unsaturated aliphatic or aromatic 5- to 8-membered ring.

$R^{19}$ can be $C_1$-$C_{20}$ alkyl groups, $C_3$-$C_{12}$ cycloalkyl groups, $C_7$-$C_{13}$ aralkyl radicals, $C_6$-$C_{14}$ aryl groups, which alkyl, cycloalkyl, aralkyl and aryl groups may be substituted in turn by $O(C_1$-$C_6$ alkyl) or $N(C_1$-$C_6$ alkyl)$_2$ groups, sulfonated groups or the salts of sulfonated groups.

Examples of suitable phosphanes of the formula $(R^{19})$xPH3-x are described by B Cornils and E. G. Kuntz in Journal of Organometallic Chemistry, 1995, 502, pages 177-186. Examples are

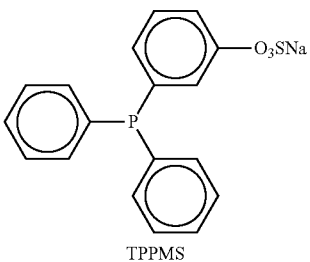
TPPMS

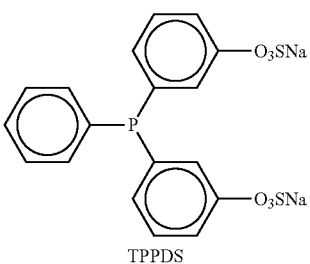
TPPDS

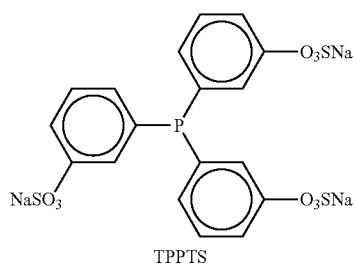
TPPTS

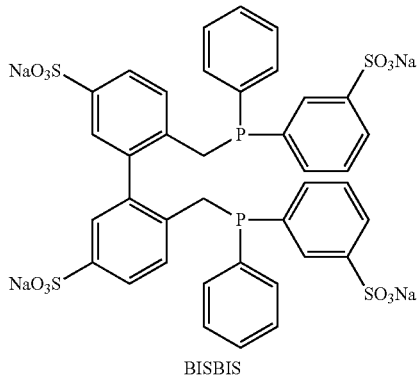
BISBIS

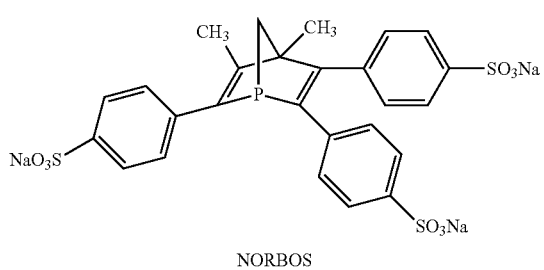
NORBOS

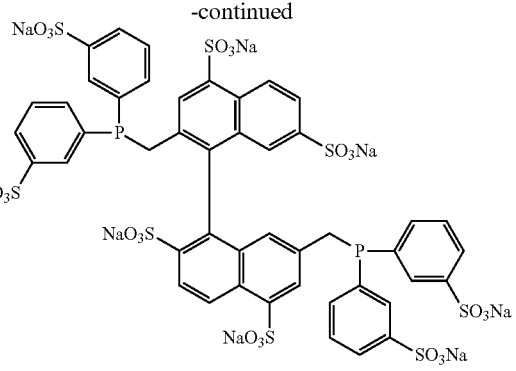
BINAS

Preferred phosphanes are the salts of mono, di and tri sulphonated triphenylphosphanes. Especially preferred are the sodium salts of mono, di and tri sulphonated triphenylphosphanes, for example TPPTS (3,3',3"-phosphanetriyl tris(benzenesulfonic acid) trisodium salt).

In the metal complex compounds of the formula 13 for use in accordance with the invention, additionally, at least one of the radicals $R^1$ to $R^9$ is necessarily in the form of a radical of the formula 14 below

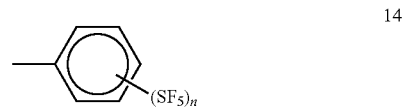

14 where n is an integer from 1 to 5.

Metal complex compounds of the formula 13 which can be used with particular advantage are those whose ligands are derived from the derivatives of salicylaldimine. Specifically complexes according to formula 15 (below) are preferred:

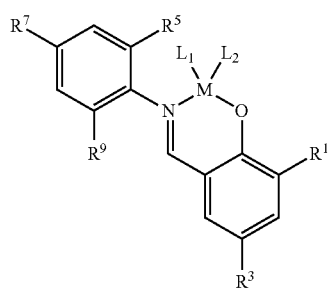

15 wherein $R^5$, $R^7$, $R^9$ are independently chosen from H, methyl, isopropyl, $NO_2$ and

where n is an integer from 1 to 5,
wherein $R^1$ and $R^3$ are independently chosen from H, methyl, isopropyl, $NO_2$, I (iodine) and

where n is an integer from 1 to 5; with the proviso that at least one of $R^1$, $R^3$, $R^5$, $R^7$ and $R^9$ is

where n is an integer from 1 to 5.

Most preferably the —$SF_5$ containing group (14) is a 3,5-dipentafluorosulfanyl phenyl group.

Preference is given, inter alia, to the following representatives of the formulae $13_1$ to $13_5$

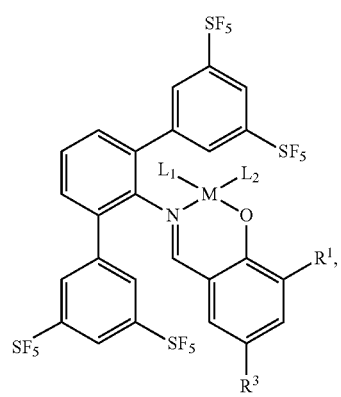

$13_1$

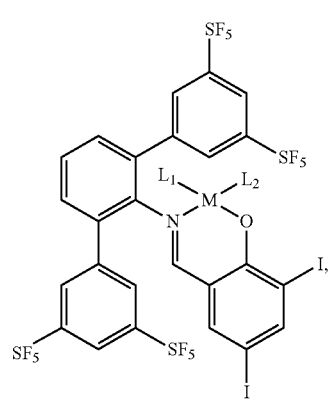

with I = iodine $13_2$

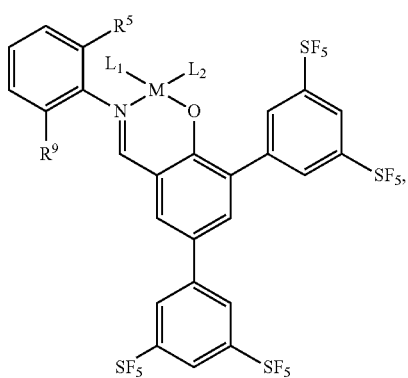

$13_3$

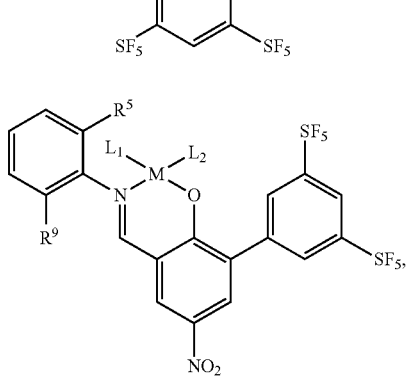

$13_4$ wherein $R^5$ and $R^9$ are independently chosen from H, —$CH_3$ or iso-propyl, and

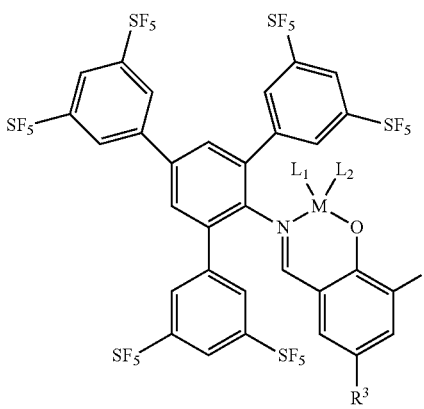

$13_5$ wherein $R^1$ and $R^3$ are independently chosen from H, $CH_3$, isopropyl, phenyl, naphthyl, anthracenyl —$NO_2$, and

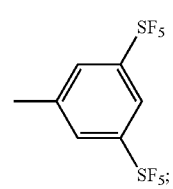

preferably $L_1$=pyridine or TPPTS and preferably $L_2$=methyl group.

For example, $L_1$ may be chosen from pyridine or TPPTS, $L_2$ may be a methyl group, and $R^1$ and $R^3$ may be independently chosen from H, $CH_3$, isopropyl, phenyl, naphthyl, anthracenyl, $NO_2$, and

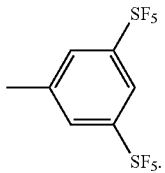

The invention also relates to the catalyst complexes which are suitable for the polymerization of olefins.

The synthesis of the complexes of the formula $13_1$-$13_5$ is known per se. The complexes of the formula 13 can be synthesized in analogy to the teachings of the documents EP-A 46331, EP-A 46328 and EP-A 52929 and also WO 98/30609 and WO 98/42664.

One preferred synthesis route for introducing the radicals of the formula 14 into the ligands or ligand precursors is that known as Suzuki coupling. It is preferred to use boric acid containing a radical of the formula 14 instead of an OH function.

Preference is given to using neutral nickel complex compounds as M in formulas 13 and $13_1$-$13_5$.

The total amount of metal complex compound used is generally from $10^{-7}$ to $10^{-2}$ mol/l, frequently from 10 to $10^{-3}$ mol/l, and often from $10^{-5}$ to $10^{-4}$ mol/l, based in each case on the total amount of water, olefinically unsaturated compounds, and, where appropriate, organic solvents.

The metal complex compounds of the formula 13 to be used in accordance with the invention may be used either by isolating them only after the reaction of the ligands with the metal compound and then introducing them into the polymerization system or else in the form of what is called an in situ system, in which case the metal complex compound is not isolated.

In analogy with the teaching of the document 052003114570, the aforementioned metal complexes can also be used in combination with an activator. Possible activators include, in particular, olefin complexes of rhodium or of nickel.

Preferred and readily available activators include nickel (olefin)$_y$ complexes, such as $Ni(C_2H_4)_3$, $Ni(1,5\text{-cyclooctadiene})_2$ "$Ni(COD)_2$", $Ni(1,6\text{-cyclodecadiene})_2$, or $Ni(1,5,9\text{-all-trans-cyclododecatriene})_2$. Particular preference is given to $Ni(COD)_2$.

Likewise suitable are mixed ethylene/1,3-dicarbonyl complexes of rhodium, such as rhodium acetylacetonate-ethylene Rh(acac) $(CH_2\!=\!CH_2)_2$, rhodium benzoylacetonate-ethylene $Rh(C_5H_5\!-\!CO\!-\!CH\!-\!CO\!-\!CH_3)$ $(CH_2\!=\!CH_2)_2$ or $Rh(C_6H_5\!-\!CO\!-\!CH\!-\!CO\!-\!C_6H_5)$ $(CH_2\!=\!CH_2)_2$. Rh(acac) $(CH_2\!=\!CH_2)_2$ is very suitable. This compound can be synthesized in accordance with R. Cramer, lnorg. Synth. 1974, 15, 14ff.

The molar ratio of activator to metal complexes is generally in the range from 0.1 to 10, frequently from 0.2 to 5, and often from 0.5 to 2.

In a certain embodiment, the invention also relates to a process for the (co)polymerization of olefinic monomers by polymerizing one or more olefinic monomers in the presence of a catalyst according to the present invention wherein an activator is present and the molar ratio of activator to catalyst is generally in the range from 0.1 to 10, frequently from 0.2 to 5, and often from 0.5 to 2.

In a certain further embodiment, the invention also relates to a process for the (co)polymerization of olefinic monomers by polymerizing one or more olefinic monomers in the presence of a catalyst according to the present invention wherein an activator is present and the molar ratio of activator to catalyst is in the range from 0.1 to 10, preferably from 0.2 to 5, more preferably from 0.5 to 2.

The invention in a yet further embodiment also relates to dispersions of polyolefins or copolymers of two or more olefins as obtained according to the process for the (co) polymerization of olefinic monomers of the present invention. In particular, the invention relates to such dispersions wherein the polyolefin is UHMwPE having a number average molecular weight Mn above 500.000 g/mol.

In a preferred embodiment, water is used as diluent and the polymerization is carried out in the presence of dispersants. The dispersants likewise used in accordance with the process of the invention may be emulsifiers or protective colloids. Examples of suitable protective colloids include polyvinyl alcohols, polyalkylene glycols, alkali metal salts of polyacrylic acids and polymethacrylic acids, gelatin derivatives, or acrylic acid, methacrylic acid, maleic anhydride, 2-acrylamido-2-methylpropanesulfonic acid and/or 4-styrenesulfonic acid copolymers and their alkali metal salts, and also N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide, amino-bearing acrylate, methacrylate, acrylamide and/or methacrylamide homopolymers and copolymers. A detailed description of further suitable protective colloids can be found in Houben-Weyl, Methoden der organischen Chemie, Volume XIV/1, Makromolekulare Stoffe, Georg-Thieme-Verlag, Stuttgart, 1961, pages 411 to 420.

It is of course also possible to use mixtures of emulsifiers and/or protective colloids. As dispersants it is common to use exclusively emulsifiers, whose relative molecular weights, unlike those of protective colloids, are usually below 1000. They may be anionic, cationic or nonionic in nature. Where mixtures of surface-active substances are used it is of course necessary that the individual components be compatible with one another, something which in case of doubt can be checked by means of a few preliminary tests. Generally speaking, anionic emulsifiers are compatible with one another and with nonionic emulsifiers. The same applies to cationic emulsifiers, whereas anionic and cationic emulsifiers are usually not compatible with one another. An overview of suitable emulsifiers can be found in Houben-Weyl, Methoden der organischen Chemie, Volume XIV/1, Makromolekulare Stoffe, Georg-Thieme-Verlag, Stuttgart, 1961, pages 192 to 208.

In accordance with the invention the dispersants used are, in particular, anionic, cationic and/or nonionic emulsifiers, preferably anionic and/or nonionic emulsifiers.

Examples of common nonionic emulsifiers include ethoxylated mono-, di-, and trialkylphenols (EQ units: 3 to 50, alkyl: $C_4$ to $C_{12}$) and also ethoxylated fatty alcohols (EO units: 3 to 80; alkyl: $C_8$ to $C_{36}$). Examples thereof are the Lutensol® A grades ($C_{12}C_{14}$ fatty alcohol ethoxylates, EQ units: from 3 to 8), Lutensol® AQ grades ($C_{13}C_{15}$ oxo alcohol ethoxylates, EQ units: 3 to 30), Lutensol® AT grades ($C_{16}C_{18}$ fatty alcohol ethoxylates, EQ units: 11 to 80), Lutensol® ON grades ($C_{10}$ oxo alcohol ethoxylates, EQ units: 3 to 11) and the Lutensol® TO grades ($C_{13}$ oxo alcohol ethoxylates, EQ units: 3 to 20), all from BASF AG.

Examples of customary anionic emulsifiers include alkali metal and ammonium salts of alkyl sulfates (alkyl: $C_8$ to $C_{16}$), of sulfuric monoesters with ethoxylated alkanols (EO units: 4 to 30, alkyl: $C_{12}$ to $C_{18}$) and with ethoxylated alkylphenols (EO units: 3 to 50, alkyl: $C_4$ to $C_{12}$), of alkylsulfonic acids (alkyl: $C_{12}$ to $C_{18}$), and of alkylarylsulfonic acids (alkyl: $C_9$ to $C_{18}$).

Compounds which have proven to be further anionic emulsifiers, additionally, are those of the formula 15

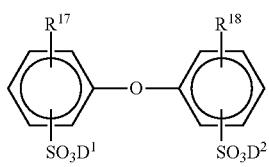

15 in which $R^{17}$ and $R^{18}$ denote hydrogen atoms or $C_4$ to $C_{24}$ alkyl but are not simultaneously hydrogen atoms, and $D^1$ and $D^2$ can be alkali metal ions and/or ammonium ions. In the formula 15, $R^{17}$ and $R^{18}$ preferably denote linear or branched alkyl radicals having from 6 to 18 carbon atoms, in particular 6, 12 or 16 carbon atoms, or hydrogen, $R^{17}$ and $R^{18}$ not simultaneously being hydrogen atoms. $D^1$ and $D^2$ are preferably sodium, potassium or ammonium, sodium being particularly preferred. Particularly advantageous compounds III are those in which $D^1$ and $D^2$ are sodium, $R^{17}$ is a branched alkyl radical of 12 carbon atoms and $R^{18}$ is a hydrogen atom or $R^{17}$. Use is frequently made of technical-grade mixtures which include a fraction of 50 to 90% by weight of the monoalkylated product, such as, for example, Dowfax® 2A1 (brand name of the Dow Chemical Company). The compounds III are general knowledge, for example, from U.S. Pat. No. 4,269,749, and are available commercially.

Suitable cationic emulsifiers are generally $C_6$ to $C_{18}$-alkyl, -aralkyl or -heterocyclyl-containing primary, secondary, tertiary or quaternary ammonium salts, alkanolammonium salts, pyridinium salts, imidazolinium salts, oxazolinium salts, morpholinium salts, thiazolinium salts, and also salts of amine oxides, quinolinium salts, isoquinolinium salts, tropylium salts, sulfonium salts and phosphonium salts. Mention may be made, by way of example, of dodecylammonium acetate or the corresponding sulfate, the sulfates or acetates of the various 2-(N,N,N-trimethylammonium)ethylparaffinic esters, N-cetylpyridinium sulfate, N-laurylpyridinium sulfate, and also N-cetyl-N,N,N-trimethylammonium sulfate, N-dodecyl-N,N,N-trimethylammonium sulfate, N-octyl-N,N,N-trimethylammonium sulfate, N,N-distearyl-N,N-dimethylammonium sulfate, and the gemini surfactant N,N'-(lauryldimethyl)ethylenediamine disulfate, ethoxylated tallow fatty alkyl-N-methylammonium sulfate and ethoxylated oleylamine (for example, Uniperol® AC from BASF AG; about 12 ethylene oxide units). Numerous further examples can be found in H. Stache, Tensid-Taschenbuch, Carl-Hanser-Verlag, Munich, Vienna, 1981 and in McCutcheon's, Emulsifiers & Detergents, MC Publishing Company, Glen Rock, 1989. It is important that the anionic countergroups are of very low nucleophilicity, such as perchlorate, sulfate, phosphate, and nitrate, for example, and carboxylates, such as acetate, trifluoroacetate, trichloroacetate, propionate, oxalate, citrate, and benzoate, for example, and also conjugated anions of organic sulfonic acids, such as methylsulfonate, trifluoromethylsulfonate, and para-toluenesulfonate, for example, and additionally tetrafluoroborate, tetraphenylborate, tetrakis(pentafluorophenyl)borate, tetrakis[3,5-bis(trifluoromethyl)phenyl]borate, hexafluorophosphate, hexafluoroarsenate or hexafluoroantimonate.

In one embodiment of the invention the borates can also comprise a —$SF_5$ group.

The emulsifiers used with preference as dispersants are employed advantageously in a total amount of 0.005 to 10 parts by weight, preferably 0.01 to 7 parts by weight, in particular 0.1 to 5 parts by weight, based in each case on 100 parts by weight of water. Depending on the polymerization system it is also possible to select the amount of emulsifiers so that their critical micelle concentration in water is not exceeded.

The total amount of the protective colloids used additionally or instead as dispersants is often 0.1 to 10 parts by weight and frequently 0.2 to 7 parts by weight, based in each case on 100 parts by weight of water.

In accordance with the invention, it is also possible, optionally, to use organic solvents of low solubility in water. Suitable solvents are liquid aliphatic and aromatic hydrocarbons having 5 to 30 carbon atoms, such as n-pentane and isomers, cyclopentane, n-hexane and isomers, cyclohexane, n-heptane and isomers, n-octane and isomers, n-nonane and isomers, n-decane and isomers, n-dodecane and isomers, n-tetradecane and isomers, n-hexadecane and isomers, n-octadecane and isomers, eicosane, benzene, toluene, ethylbenzene, cumene, o-, m- or p-xylene, mesitylene, and also, generally, hydrocarbon mixtures boiling in the range from 30 to 250° C. It is likewise possible to use hydroxy compounds, such as saturated and unsaturated fatty alcohols having 10 to 28 carbon atoms, examples being n-dodecanol, n-tetradecanol, n-hexadecanol and their isomers or cetyl alcohol, esters, such as fatty acid esters having from 10 to 28 carbon atoms in the acid moiety and 1 to 10 carbon atoms in the alcohol moiety or esters of carboxylic acids and fatty alcohols having 1 to 10 carbon atoms in the carboxylic acid moiety and 10 to 28 carbon atoms in the alcohol moiety. It is of course also possible to use mixtures of aforementioned solvents.

The total amount of solvent is up to 15 parts by weight, preferably 0.001 to 10 parts by weight, and with particular preference 0.01 to 5 parts by weight, based in each case on 100 parts by weight of water.

It is advantageous if the solubility of the solvent or solvent mixture under reaction conditions in the aqueous reaction medium is as far as possible ≤50% by weight, ≤40% by weight, ≤30% by weight, ≤20% by weight or ≤10% by weight, based in each case on the total solvent amount.

Solvents are used especially when the olefinically unsaturated compounds are gaseous under reaction conditions (pressure/temperature), as is the case, for example, with ethene, propene, 1-butene and/or isobutene.

The process of the invention can be carried out by dissolving, in a first step, the total amount of the metal complexes, i.e., of the metal complex compound of the formula 13 and also of the activators (used optionally), in a portion or the entirety of the olefins and/or of the organic solvents of low solubility in water. This solution is then dispersed together with the dispersants in an aqueous medium with the formation of oil-in-water dispersions having an average droplet diameter≥1 000 nm, referred to as macroemulsions. It is possible that these macroemulsions are then converted by known measures into oil-in-water emulsions having an average droplet diameter≤1 000 nm, referred to as miniemulsions, which are admixed at reaction temperature with any remaining portion or entirety of the compounds and/or of the organic solvents of low solubility in water.

The general preparation of aqueous miniemulsions from aqueous macroemulsions is known to the skilled worker (cf. P. L. Tang, E. D. Sudol, C. A. Silebi, and M. S. El-Aasser in Journal of Applied Polymer Science, 43 [1991] 1059-1066).

One embodiment of the process of the invention is such, for example, that the total amounts of the metal complex and of any activators added are dissolved in a portion or the entirety of the organic solvents of low solubility in water. This organic metal complex solution is then dispersed, together with a portion or the entirety of the dispersants, in water to form a macroemulsion. This macroemulsion is converted into a miniemulsion by means of a homogenizing apparatus. For this purpose it is possible, for example, to employ devices wherein the fine distribution of the components is achieved by means of a high local energy input, for instance by a commercially available high pressure homogenizers or by means of ultrasound.

The total amount of the olefins and any remaining amounts of organic solvents or dispersants are metered into this miniemulsion at reaction temperature and with continual stirring. This process variant is chosen in particular when the olefins used are gaseous under reaction conditions, as is the case, for example, with ethene, propene, 1-butene and/or isobutene.

In a further embodiment the total amounts of the metal complex and optionally any activators added, are dissolved in a portion or the entirety of the olefins. This organic metal complex solution is then dispersed, together with a portion or the entirety of the dispersants, in water to form a macroemulsion. By means of one of aforementioned homogenizing methods the macroemulsion is converted into a miniemulsion. Any remaining amounts of olefins or dispersants and also, where appropriate, the total amount of the organic solvents of low solubility in water, are metered into this miniemulsion at reaction temperature and with continual stirring. This process variant is chosen in particular when the olefinically unsaturated compounds used are liquid under reaction conditions, as is the case, for example, with 1-pentene, cyclopentene, 1-hexene, cyclohexene, 1-octene, 1-decene, 1-dodecene, 1-tetradecene and/or 1-hexadecene.

It is significant that the liquid droplets which are present in the form of a separate phase in the aqueous medium may contain not only the aforementioned compounds, i.e., the metal complex compounds, the activators where appropriate, and the solvent, and also the olefins, but also further components. Examples of further components include formulating assistants, antioxidants, light stabilizers, and also dyes, pigments and/or waxes for water repellency, or even nano-particles. If the solubility of the further components in the organic phase making up the droplets is greater than in the aqueous medium, then these remain in the droplets during the polymerization reaction. Since the droplets which contain the metal complexes and are formed from olefins and/or solvents of low solubility in water ultimately constitute the sites of the polymerization, the polymer particles formed generally contain these additional components resulting in a very homogeneously distribution.

The polymerization itself normally takes place at a minimum pressure of 1 bar; below this pressure, the polymerization rate is too low. Preference is given to 2 bar, and particular preference to a minimum pressure of 10 bar.

4000 bar may be stated as a-maximum pressure; at higher pressures, the requirements imposed on the material of which the polymerization reactor is made are very high, and the operation becomes uneconomic. Preference is given to ≤100 bar and particular preference to ≤50 bar.

The polymerization temperature can be varied within a wide range. 10° C. may be stated as a minimum temperature, since at low temperatures the polymerization rate falls. Preference is given to a minimum temperature of 20° C. and with particular preference 30° C. The maximum rational temperature may be stated as being 350° C. and preferably 150° C., with 100° C. being particularly preferred.

By means of the process of the invention it is possible to obtain aqueous copolymer dispersions whose solids content is 0.1 to 70% by weight, frequently 1 to 65% by weight, and often 5 to 60% by weight, and all values in between.

In one embodiment, the present invention further relates to aqueous dispersions of polyolefins or copolymers of two or more olefins and also to the use of the aqueous dispersions of the invention for paper applications such as paper coating or surface sizing, paints and varnishes, adhesive base materials, molded foams such as mattresses, textile and leather applications, carpet-backing coatings, or pharmaceutical applications. In a further embodiment, application for the preparation of nano-composites is possible, as disclosed by Mecking et al in Macromolecules 2014, 47, page 3017-3021.

In one embodiment the present invention relates to a high molecular weight polyolefin, preferably polyethylene, obtainable in the process according to the invention. Preferably the high molecular weight polyolefin is a high molecular weight polyethylene (HMWPE), or even an ultra-high molecular weight polyethylene (UHMWPE), having a Mn of at least 500.000 g/mol. In a further embodiment, the invention relates to disentangled UHMwPE.

Naturally, the residual monomers left in the aqueous polymer system after the end of the main polymerization reaction can be removed by means of steam stripping and/or inert gas stripping, familiar to the skilled worker, without detriment to the properties of the polymers present in the aqueous medium.

In one embodiment, the process of the invention opens up an economic, environmental, and preparatively simple route, with substantially no safety concerns, to aqueous ultra-high molecular weight polymer dispersions of inexpensive olefins. On the basis of their preparation, the aqueous polymer dispersions obtainable in accordance with the invention contain polymer particles containing extremely small amounts, if any, of organic solvents. However, where the process of the invention is carried out in the presence of solvents of low solubility in water, it is possible to prevent any odor nuisance during the formation of polymer films by selecting high-boiling solvents. Moreover, the optionally used solvents frequently act as coalescants and so promote film formation. In accordance with the process of the invention it is also possible, furthermore, to obtain aqueous polymer dispersions whose polymer particles, in addition to the polymer, include further additives, such as formulating assistants, antioxidants, light stabilizers, and also dyes, pigments and/or waxes, for example.

Another of the features of the aqueous dispersions which are likewise part of the invention is that they comprise polyolefins having a high molar mass.

Another feature of the process is that nano-composites can be obtained featuring ultra-high molecular weight polyolefins.

EXAMPLES

Determination of Molecular Weight

Molecular weights (weight-average molecular weight (Mw) and number-average molecular weight (Mn)) of obtained polyethylenes were determined by HT-GPC in 1,2,4-trichlorobenzene at 160° C. at a flow rate of 1 mL min-1 on a Polymer Laboratories 220 instrument equipped with Olexis columns with differential refractive index, viscosity, and light scattering detectors. Determination of Mw and Mn was performed in accordance with the method of ASTM D647412.

Polymerization in Toluene

Ethylene polymerizations in toluene were carried out in a 300 mL stainless steel mechanically stirred pressure reactor equipped with a heating/cooling jacket supplied by a thermostat controlled by a thermocouple dipping into the polymerization mixture. This reactor was placed under vacuum and backfilled with argon, this process was repeated three times at temperatures above 60° C. to ensure the reactor was thoroughly degassed before cooling to 5° C. below the desired temperature. 100 mL of distilled and degassed toluene was then cannula-transferred to the cooled reactor and stirred at 500 rpm. 5 µmol of the appropriate precatalyst was then dissolved in minimal toluene and transferred to the reactor via syringe. The stirring speed was increased to 1000 rpm and the reactor was pressurized to a constant pressure of 40 bar of ethylene, while the temperature was increased to the desired value. Ethylene flow to the reactor was stopped after 40 minutes and the reactor was carefully vented. Bulk polymer was precipitated in methanol, filtered, washed thoroughly with methanol and dried in vacuum oven (50° C., 30 mBar) overnight.

Polymerization in Aqueous Dispersion

Ethylene polymerizations in aqueous media were carried out in a 300 mL stainless steel mechanically stirred pressure reactor equipped with a heating/cooling jacket supplied by a thermostat controlled by a thermocouple dipping into the polymerization mixture. This reactor was placed under vacuum and backfilled with argon, this process was repeated three times at temperatures above 60° C. to ensure the reactor was thoroughly degassed before cooling to 10° C. In a 250 mL Schienk-type glass vessel, SOS (sodiumdodecylsulfate) (1.5 or 3 g) and CsOH (512 mg, if required) were dissolved in 100 mL distilled and degassed water, 90 mL of the resulting homogeneous solution was then cannula-transferred to the cooled reactor and stirred at 500 rpm. 5 µmol of the appropriate precatalyst was then dissolved in the remaining 10 mL of aqueous solution and transferred to the reactor via syringe. The stirring speed was increased to 1000 rpm and the reactor was pressurized to a constant pressure of 40 bar of ethylene, while the temperature was increased to the desired value. Ethylene flow to the reactor was stopped after the appropriate time (30 or 60 minutes) and the reactor was carefully vented. The resulting dispersion was filtered over cotton wool, and the solids content was determined by precipitation of a 20 g aliquot with 150 mL methanol. The obtained bulk polymer was then filtered, washed thoroughly (with water and methanol) and dried in a vacuum oven (50° C., 30 mBar) overnight.

Examples with group 7-10 Transition Metals.

Synthesis of —SF$_5$Substituted Compounds

Synthesis of the desired —SF$_5$-substituted ligands was simple and required only a few steps. The commercially available 1-bromo-3,5-bis(pentafluorosulfanyl)benzene is easily converted to the pinacol-protected boronic acid ester (3) using Pd(dppf)Cl$_2$. GC showed conversion of the starting material to the product was >95% after 4.5 hours and the pure product could be isolated in a 76% yield.

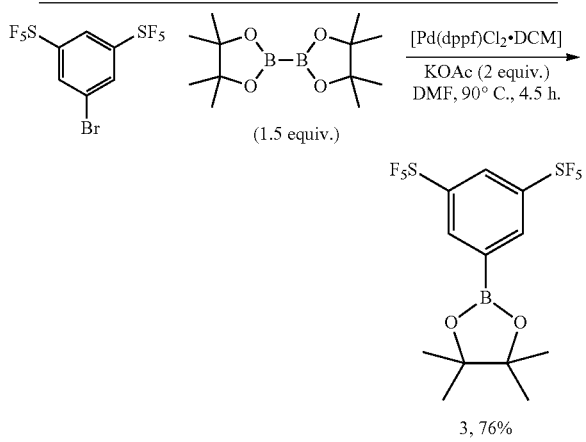

Scheme 2. Catalytic Transformation of -SF$_5$-containing Brominated Compound to a Boronic Acid Ester.

From the boronic acid ester, the desired anilines (4, 6) were synthesized by Suzuki coupling either with 2,6-dibromo- or 2,4,6-tribromoaniline. Salicylaldimines (5, 7) were then synthesized by acid catalysed condensation of these anilines with the appropriate salicylaldehyde. Precatalysts (1-SF$_5$/Py, 2-SF$_5$/Py) were obtained in near quantitative yields by reaction with (TMEDA)NiMe2 in the presence of pyridine (Scheme 1).

Synthesis of a water soluble complex is performed by introducing TPPTS (3,3',3"-Phosphanetriyltris (benzenesulfonic acid) trisodium salt) as a ligand to an intermediate complex, stabilised by the labile neutral ligand DMF. Complete exchange of DMF for TPPTS was unsuccessful but by washing away the lipophilic intermediate catalyst a crude pre-catalyst mixture of the water soluble complex 1-SF$_5$/TPPTS, free TPPTS, and residual DMF was isolated. From the 1H NMR relative ratios of these compounds can be determined, allowing for an approximate molecular weight to be calculated. This crude mixture could then be used to give stable dispersions of polyethylene through direct polymerisation.

Scheme 3. Synthesis of Water Soluble Ni(II) Precatalyst 1-SF$_5$/TPPTS.

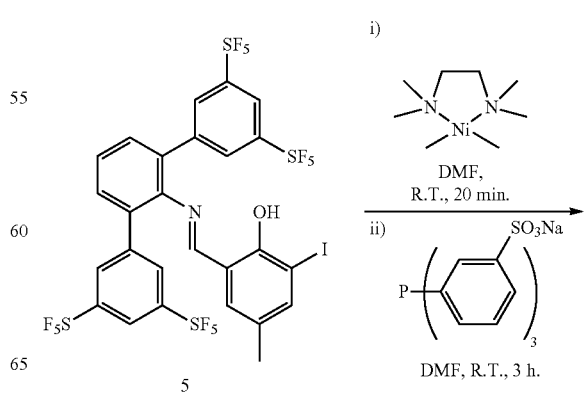

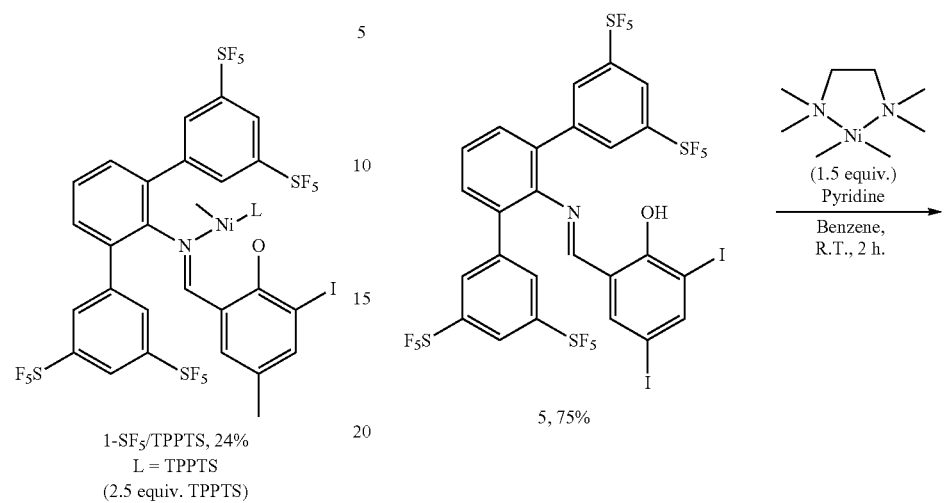
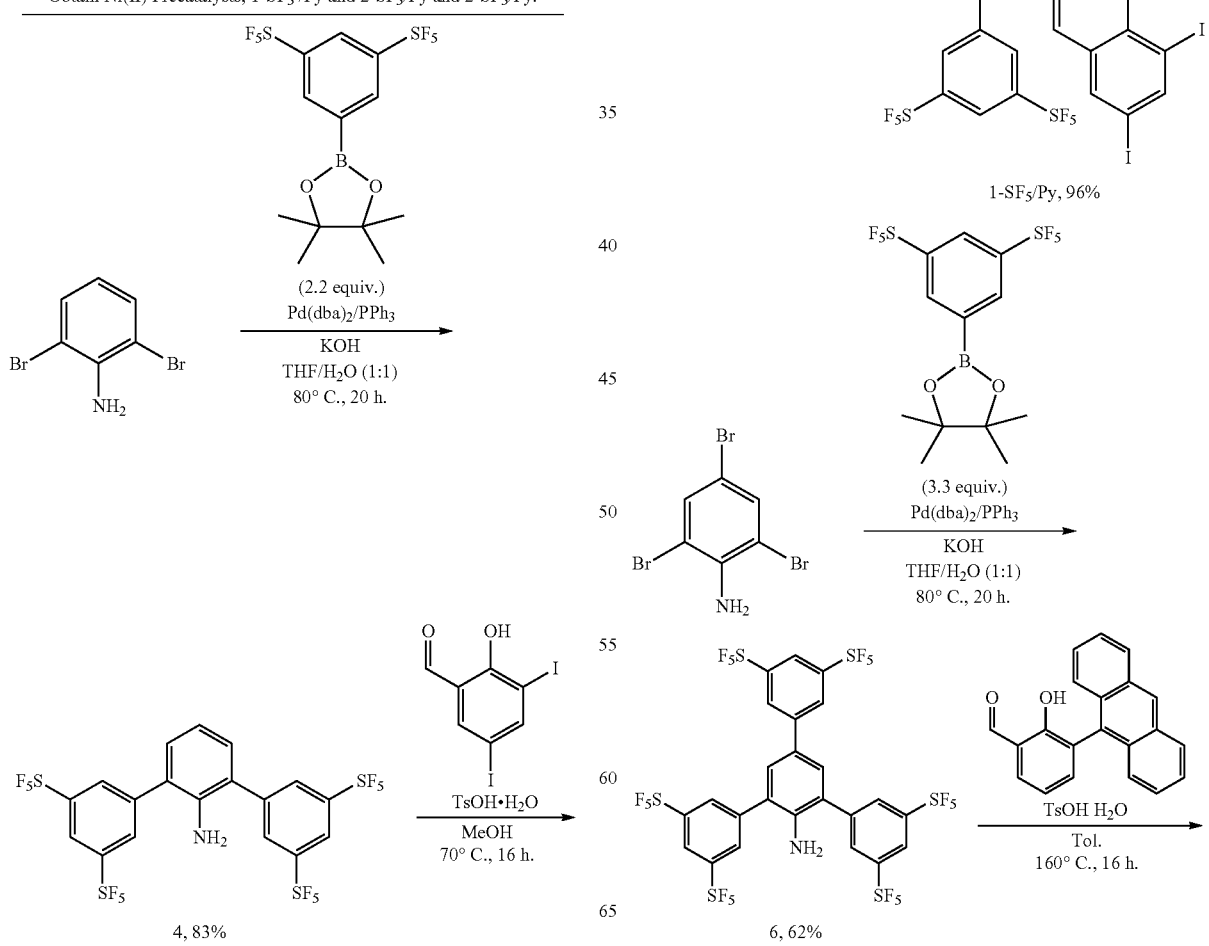
Scheme 1. Synthesis of -SF$_5$-Substituted Ligands and Complexation to Obtain Ni(II) Precatalysts, 1-SF$_5$/Py and 2-SF$_5$/Py and 2-SF$_5$/Py.

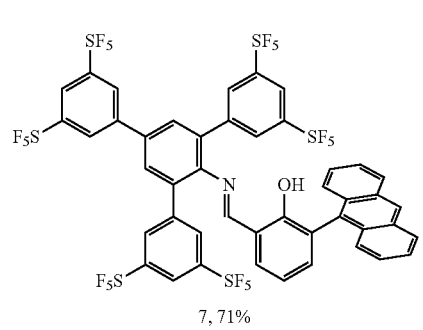

7, 71%

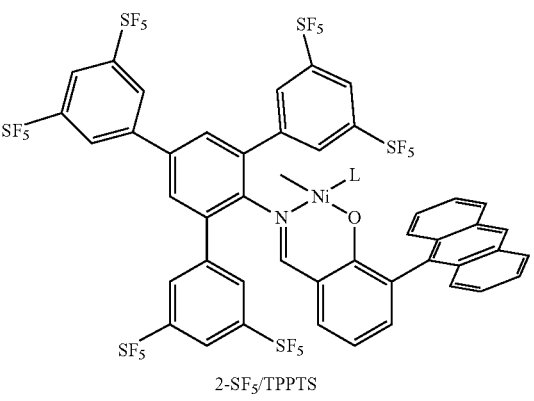

2-SF₅/TPPTS
L = TPPTS

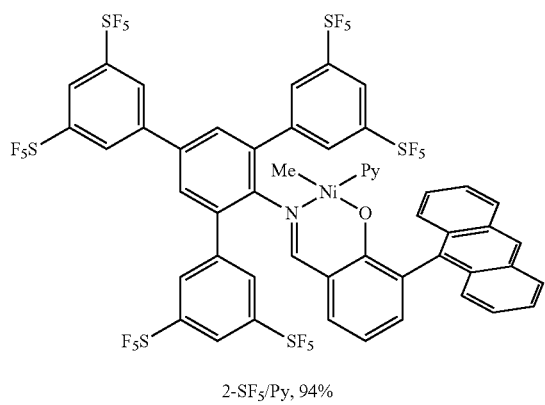

2-SF₅/Py, 94%

Further two catalysts (1-SF₅/TPPTS and 2-SF₅/TPPTS) have been prepared according to the following structures:

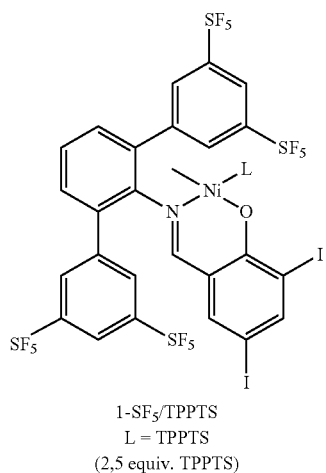

1-SF₅/TPPTS
L = TPPTS
(2,5 equiv. TPPTS)

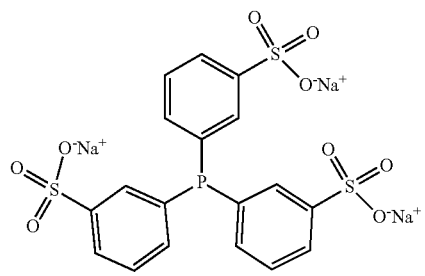

TPPTS is 3,3',3''-Phosphanetriyltris(benzenesulfonic acid) trisodium salt

COMPARATIVE EXAMPLES

Nickel catalyst were prepared using CF₃ substituents (as comparative examples), and the catalytic performance was compared to the catalysts bearing the inventive —SF₅ substituents.

Comparative Examples (CF₃ Substituents)

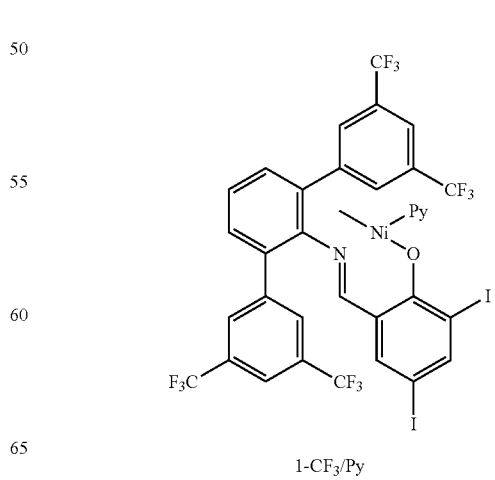

1-CF₃/Py

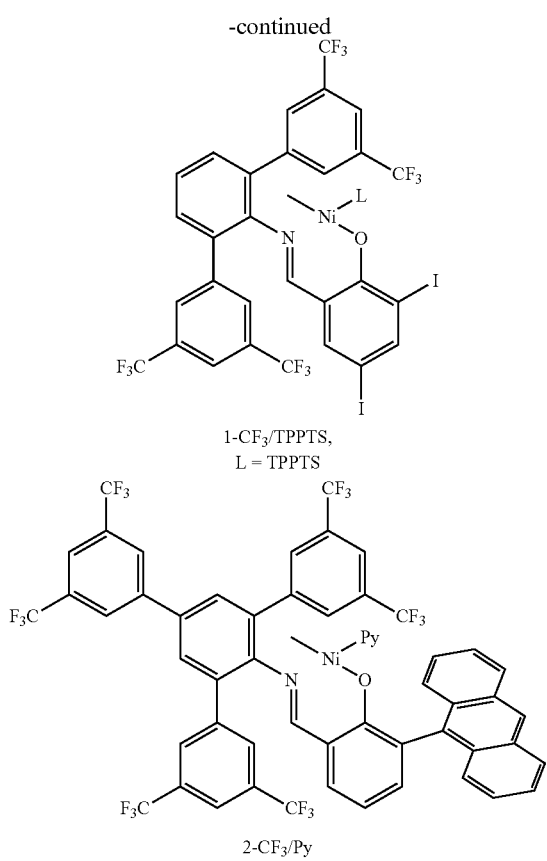

1-CF₃/TPPTS,
L = TPPTS

2-CF₃/Py

Polymerizations

Initial polymerisations were carried out in toluene over a wide temperature range (30-70° C.) to assess the effect of the substituent on both catalyst performance and polymer properties. In toluene —SF₅-substituted complexes show reduced productivity when compared to analogous CF₃-complexes, (shown in FIG. 2) particularly in the case of 2-SF₅/Py at 30° C. (Table 1, Entry 7).

While the loss of activity may seem like a drawback to using —SF₅-complexes, it is relatively small and in the case of 1-SF₅/Py the turnover frequencies (TGIF) are comparable. There are also several known methods for enhancing the activity of these neutral Ni (II) salicylaldiminato complexes. These include destabilising the resting state through ligand design, the use of less strongly coordinating ligands and removing the neutral ligand via phase transfer or addition of appropriate scavengers. The —SF₅-substituent also has a significant effect on polymer properties. As the polymerisation temperature is increased, an increase in β-hydrogen elimination leads to a decrease in polymer melting temperature as branching increases (and molecular weight decreases). Compared with polymers produced using the CF₃-analogs, this decrease in melting temperature is significantly reduced, which can be a significant advantage in certain polymer applications. While the melting temperatures of the polymers produced at 30° C. are comparable, the polymers produced using —SF₅— complexes at 70° C. have melting temperatures 7 and 8° C. higher than those produced by CF₃-analogs. The branches that are formed by the —SF₅-substituted catalysts are shown by $^{13}C$ NMR to be exclusively methyl branches, showing that even after β-hydrogen elimination, chain walking is limited and subsequent insertions are fast. Furthermore NMR confirms the significant decrease in branching at higher temperatures for —SF₅-substituted complexes. Unlike the CF₃-analogs, 1-SF₅/Py and 2-SF₅/Py show very similar degrees of branching, despite the significantly different catalyst structures. Comparing 1-SF₅/Py and 1-CF₃/Py there are significant gains in molecular weight at all temperatures. Polymerisation at 50° C. (Table 1. Entries 2 and 5) is perhaps the clearest example of how effective this simple substitution can be with the introduction of —SF₅-substituents leading to a tripling of molecular weight. With 2-SF₅/Py and 2-CF₃/Py a similar trend is seen, with polymerisations at higher temperatures (50, 70° C.) giving polymers with significantly higher molecular weights when 2-SF₅/Py is used. Overall it is clear that the introduction of —SF₅-substituents leads to a significant improvement in polymer properties, although there is a slight reduction in productivity.

TABLE 1

Ethylene Polymerisation Results with Complexes 1-SF₅/Py, 2-SF₅/Py and CF₃-Analogs (1-CF₃/Py, 2-CF₃/Py) as Precatalysts in Toluene.[a]

| Entry | Precatalyst | T [° C.] | Yield [g] | TOF[b] | $M_n$ [10³ g/mol][c] | $M_w/M_n$[c] | $T_m$ [° C.][d] | Crystallinity [%][d] | Branches/ 1000 C.[e] |
|---|---|---|---|---|---|---|---|---|---|
| 1 | 1-SF₅/Py | 30 | 1.88 | 2.02 | 302.8 | 1.6 | 134 | 55 | 1.0 |
| 2 | 1-SF₅/Py | 50 | 4.85 | 5.20 | 115.1 | 2.5 | 128 | 56 | 2.5 |
| 3 | 1-SF₅/Py | 70 | 7.38 | 7.91 | 24.1 | 2.3 | 122 | 54 | 7.2 |
| 4 | 1-CF₃/Py | 30 | 3.41 | 3.66 | 174.6 | 1.8 | 131 | 53 | 2.9 |
| 5 | 1-CF₃/Py | 50 | 5.47 | 5.86 | 26.5 | 2.3 | 121 | 59 | 8.1 |
| 6 | 1-CF₃/Py | 70 | 10.7 | 11.41 | 10.0 | 2.0 | 115 | 61 | 11.7 |
| 7 | 2-SF₅/Py | 30 | 0.40 | 0.42 | 263.3 | 2.0 | 132 | 58 | 1.0 |
| 8 | 2-SF₅/Py | 50 | 3.29 | 3.53 | 122.3 | 3.3 | 128 | 56 | 3.0 |
| 9 | 2-SF₅/Py | 70 | 9.48 | 10.15 | 25.1 | 2.3 | 121 | 56 | 8.0 |
| 10 | 2-CF₃/Py | 30 | 4.06 | 4.35 | 466.1 | 1.6 | 132 | 55 | 1.7 |
| 11 | 2-CF₃/Py | 50 | 6.91 | 7.40 | 31.5 | 2.5 | 118 | 55 | 10.6 |
| 12 | 2-CF₃/Py | 70 | 19.03 | 20.39 | 11.6 | 2.2 | 113 | 52 | 15.2[f] |

[a]Polymerisation Conditions: 5 μmol of precatalyst, 100 mL of toluene, 40 bar of C₂H₄, 40 min.
[b]10⁴ × mol [C₂H₄] × mol⁻¹ [Ni] × h⁻¹.
[c]Determined by GPC at 160° C.
[d]Determined by DSC.
[e]Determined by $^{13}C$ NMR spectroscopy.
[f]Includes 1.1 ethyl branches and <0.5 n-propyl branches.

Polymerisation with the water soluble catalyst 1-SF$_5$/TPPTS, were carried out to obtain dispersions of high molecular weight, linear polyethylene. Unlike the polymerisations in toluene, there does not seem to be a significant difference in productivity between —SF$_5$- and CF$_3$-substituted complexes in aqueous media. Adding CsOH (to suppress hydrolysis), increases the productivity of 1-CF$_3$/TPPTS to the point where it is more productive than 1-SF$_5$/TPPTS. Suggesting that in the absence of hydrolysis, 1-CF3/TPPTS may be more productive, as might be expected from the results in toluene. However it could also arise from the large amounts of free ligand present in the crude mixture of 1-SF$_5$/TPPTS stabilising the catalyst.

TABLE 2

Ethylene Polymerisation Results with Complex 1-SF$_5$/TPPTS and its CF$_3$-Analog, 1-CF$_3$/TPPTS as Precatalysts in Water.[a]

| Entry | Precatalyst | Yield [g] | TON[c] | M$_n$ [10$^3$ g/mol][d] | M$_w$/M$_n$[d] | T$_m$ °C.[e] | Crystallinity [%][e] | Particle Size (nm)[f] | Branches/ 1000 C.[g] |
|---|---|---|---|---|---|---|---|---|---|
| 1 | 1-SF$_5$/TPPTS | 3.20 | 2.30 | 1195 | 1.3 | 141/137 | 75/56 | 27 | <0.7 |
| 2[b] | 1-SF$_5$/TPPTS | 3.95 | 2.85 | 1406 | 1.3 | 140/136 | 76/51 | 25 | <0.7 |
| 3 | 1-CF$_3$/TPPTS | 2.18 | 1.56 | 428 | 1.2 | 137/132 | 72/58 | 22 | 2.6 |
| 4[b] | 1-CF$_3$/TPPTS | 4.62 | 3.30 | 501 | 1.2 | 136/131 | 75/53 | 29 | 2.4 |

[a]Polymerisation Conditions: 5 μmol of precatalysts, 100 mL H$_2$O, 15° C., 1.5 g SDS, 40 bar of C$_2$H$_4$, 30 min.
[b]100 mL H$_2$O, 15° C., 3 g SDS, 512 mg CsOH•H$_2$O, 60 min.
[c]10$^4$ × mol [C$_2$H$_4$] × mol$^{-1}$ [Ni].
[d]Determined by GPC at 160° C.
[e]Determined by DSC, 1$^{st}$/2$^{nd}$ heating.
[f]Determined by DLS, volume average.
[g]Determined by $^{13}$C NMR spectroscopy.

Unlike the CF$_3$-analog, complex 1-SF$_5$ITPPTS produces a dispersion of polyethylene with the characteristic melt properties of linear ultra-high molecular weight polyethylene (UHMWPE) i.e. an exaggerated first melting temperature in the region of 140° C. while a melting temperature of ≈135° C. is obtained for all subsequent melting. Dispersions with these melting properties have been obtained previously as 'ideal polyethylene nanocrystals', however this required a lower polymerisation temperature of 10° C., to limit branching and the Mn was not exceeding 420.000 g/mol. Polymerisation at 10° C. is undesirable because at this temperature ethylene hydrate formation can lead to large temperature changes and destabilization of the polyethylene dispersion. At 10° C. polymerization is only possible for short reaction times through the use of additives (such as PEG) which can suppress ethylene hydrate formation. Complex 1-SF$_5$/TPPTS is also significantly more productive than the catalyst used to produce ideal polyethylene nanocrystals, producing dispersions with higher polymer content at half the catalyst loading. Although the 'ideal polyethylene nanocrystals' synthesized previously showed similar melting behaviour to linear UHMWPE. They had a relatively low molecular weight (Mn=420 kg mol-1) compared to UHMWPE (Mn >500 kg mol-1). This disparity in melt behaviour and molecular weight is reduced by using complex 1-SF$_5$/TPPTS. With this catalyst polyethylene with molecular weights (as Mn) of over 1,000 kg mol-1 are obtained, and with appropriate additives a gain in molecular weight of 1,000 kg mol-1 above the previous state of the art can be obtained (Table 2. Entry 2). Like other dispersions produced using this method of polymerisation, the polyethylene is produced in the form of highly organised crystals. Although the crystals produced by this catalyst are larger (<250 nm) and less uniform in size, a high crystallinity is maintained (575%) and that the polyethylene is disentangled is evident from the fact that an exaggerated first melting temperature is not observed when slow melting rates are used.

Example with Ti as Transition Metal

Ti-catalysts having the below pre-catalysts structures have been prepared.

Pre-Catalyst Structures:

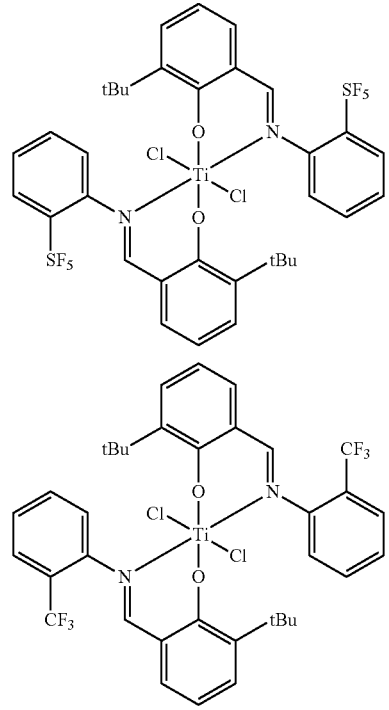

The catalyst having CF$_3$ groups is a comparative catalysts, while the catalyst with —SF$_5$ groups is a catalyst according to the present invention.

Synthesis of TMS-Ligand:

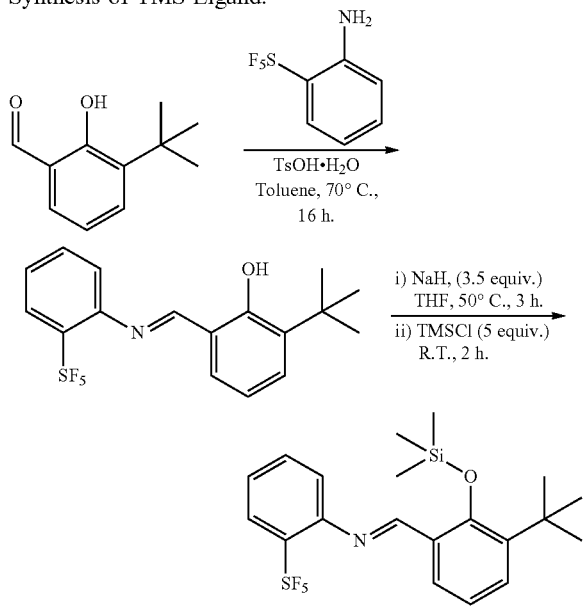

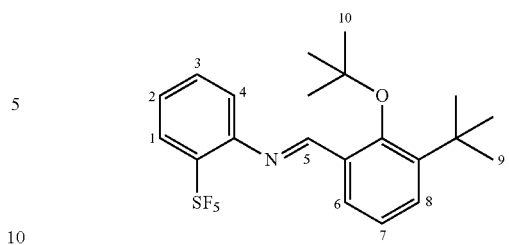

$^1$H NMR (400 MHz, CDCl$_3$): δ 8.65 (s, 1H) 5, 8.03 (dd, J=7.7, 1.9 Hz, 1H) 6, 7.87 (dd, J=8.4, 1.3 Hz, 1H) 1, 7.52 (m, 2H) 3, 8, 7.28 (t, J=7.9 Hz, 1H) 2, 7.07 (t, J=7.7 Hz, 1H) 7, 6.94 (d, J=7.9 Hz, 1H) 4, 1.47 (s, 9H) 9, 0.31 (s, 9H) 10.

Synthesis of (tBu_SF$_5$_SA)$_2$TiCl$_2$ Via Dehalosilylation:

TMS-SF$_5$-Fl ligand (271 mg, 0.6 mmol) was dissolved in toluene (3 mL) and added to a solution of TiCl$_4$ (57 mg, 0.3 mmol) in toluene (1 mL). Solution immediately turned red and was left to stir for 3.5 hours. Solvents were removed under vacuum giving an oily red solid which was washed with pentanes (2×5 mL) giving a red/orange powder (85 mg, 0.1 mmol, 33%).

$^1$H NMR (400 MHz, C$_6$D$_6$): δ 7.85 (s, 2H), 7.47 (d, J=8.6 Hz, 2H) 7.30 (d, J=7.9 Hz, 4H) 6.87 (t, J=7.73 Hz, 2H), 6.74 (d, J=7.5 Hz, 2H), 6.66 (m, 4H), 1.46 (s, 18H).

| Catalyst | Temperature (° C.) | Yield (g) | TON (×10$^3$ Ti$^{-1}$) | T$_m$ (° C.) | Mn (kg mol$^{-1}$) | Mw (kg mol$^{-1}$) | PDI |
|---|---|---|---|---|---|---|---|
| CF$_3$ | 70 | 0.070 | 2.5 | >135 | 38 | 201 | 5.3 |
| SF$_5$ | 70 | 0.136 | 4.3 | >135 | 149 | 438 | 2.9 |

Catalyst Loading: 1 μmol, Al:Ti = 750:1.

Synthesis of —SF$_5$-Fl Ligand:

Aminophenylsulfurpentafluoride (1.096 g, 5 mmol) and 3-tert-butylsalicylaldehyde (0.893 g, 5 mmol) were dissolved in toluene (6 mL) acidified with TsOH.H$_2$O. This mixture was stirred at 70° C. overnight. After overnight stirring solvents removed to give an oily yellow solid, this was washed with methanol (2×5 mL) and yellow powder dried under high vacuum (1.49 g, 3.9 mmol, 79%).

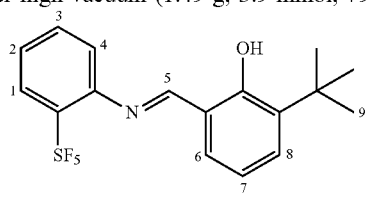

$^1$H NMR (400 MHz, CDCl$_3$): δ 13.04 (br s, 1H) OH, 8.50 (s, 1H) 5, 7.91 (dd, J=8.4, 1.3 Hz, 1H) 1, 7.59 (td, J=7.7, 1.4 Hz, 1H) 3, 7.49 (dd, J=7.7, 1.7 Hz, 1H) 8, 7.37 (t, J=7.9 Hz, 1H) 2, 7.30 (dd, J=7.7, 1.8 Hz, 1H) 6, 7.10 (m, 1H) 4, 6.93 (t, J=7.7 Hz, 1H) 7, 1.52 (s, 9H) 9.

Synthesis of TMS-SF$_5$-Fl Ligand:

SF$_5$-Fl ligand (1.25 g, 3.3 mmol) was dissolved in abs. THF (12 mL) and added to a schlenk containing NaH (450 mg). This was then stirred at 50° C. for 3 hours before addition of excess TMSCl (2.1 mL). The resulting decoloured mixture was allowed to stir for 2 hours before solvents were removed. Solids were re-suspended in pentanes (15 mL) and filtered. Removal of pentanes gave the product as a white solid (810 mg, 1.8 mmol, 54%).

Polymerization Procedure

Ethylene polymerizations with titanium catalysts in toluene were carried out in a 300 mL stainless steel mechanically stirred pressure reactor equipped with a heating/cooling jacket supplied by a thermostat controlled by a thermocouple dipping into the polymerization mixture. This reactor was placed under vacuum and backfilled with argon, this process was repeated three times at temperatures above 60° C. to ensure the reactor was thoroughly degassed before cooling to the desired temperature. 100 mL of distilled and degassed toluene was then cannula-transferred to the cooled reactor and stirred at 500 rpm. 0.5 mL MAO-10T (750 μmol) was then added to the reactor via syringe and allowed to stir. 1 μmol of the appropriate precatalyst was then added via syringe. The stirring speed was increased to 1000 rpm and the reactor was pressurized to a constant pressure of 6 bar of ethylene. Ethylene flow to the reactor was stopped after 10 minutes and the reactor was carefully vented. Polymer was collected and stirred in methanol (acidified with HCl.), filtered, washed thoroughly with methanol and dried in a vacuum oven (50° C., 30 mBar) overnight.

The invention claimed is:

1. Transition metal complex suitable for use in a catalyst for olefin polymerization wherein the metal complex comprises at least one —SF$_5$ group attached to a ligand bound to the metal, wherein the metal is Ti, Zr, or Hf.

2. The transition metal complex according to claim 1, having one of the structures according to:

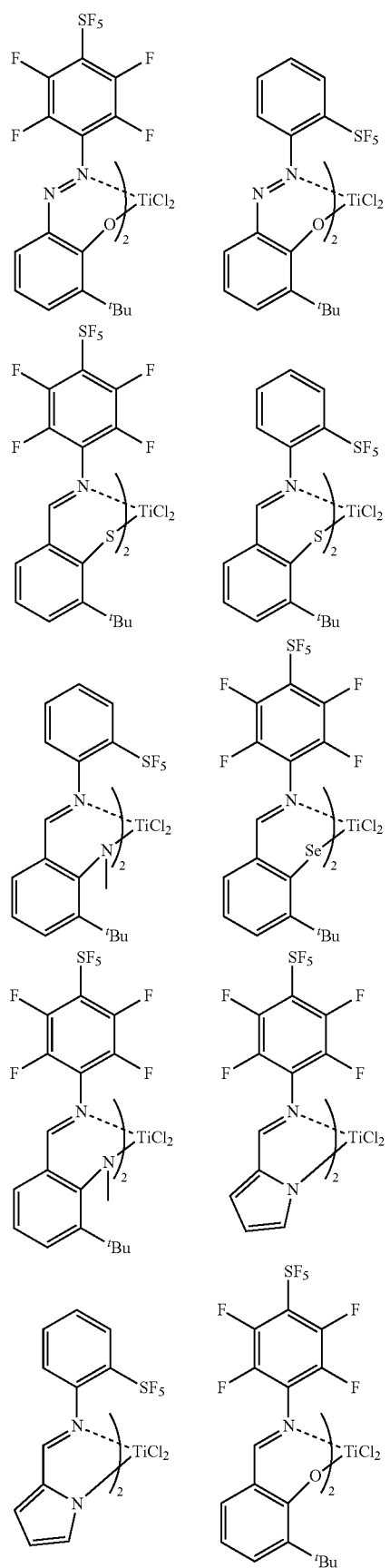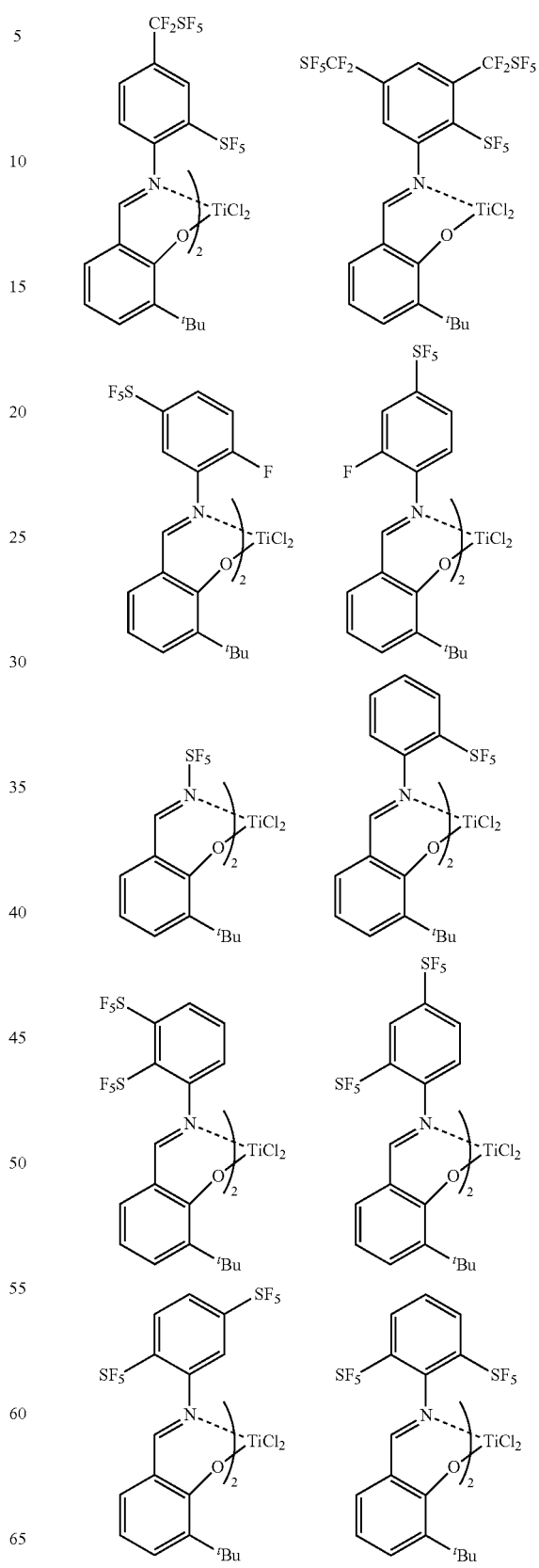

-continued

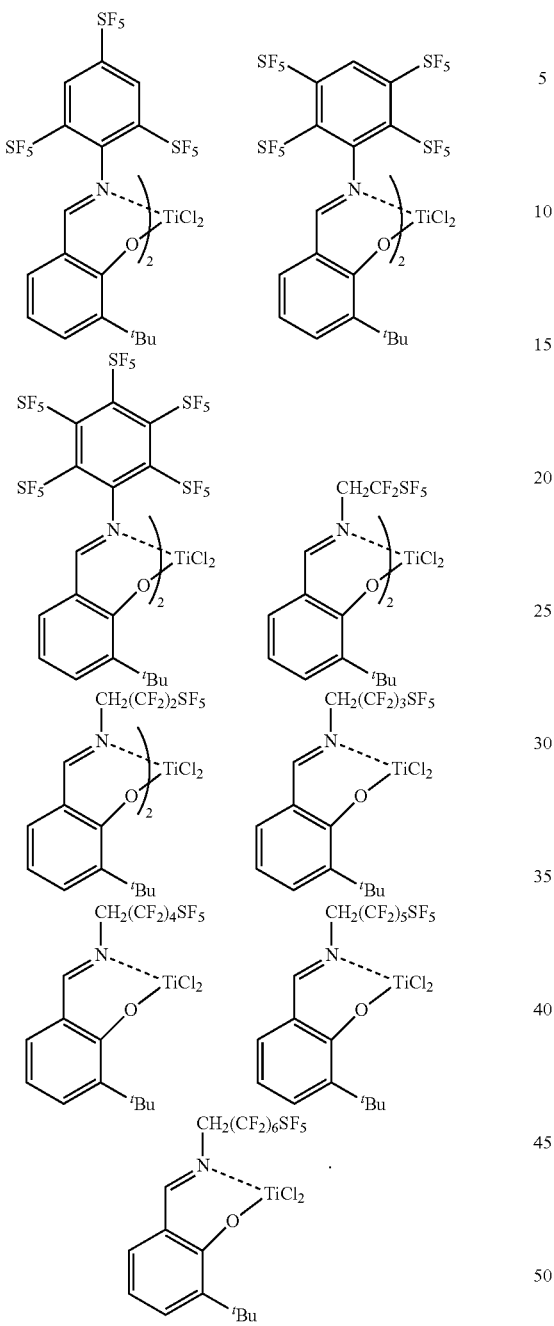

3. A catalyst for polymerization of olefins, the catalyst comprising a transition metal complex according to claim 1 and optionally a cocatalyst.

4. A process for the (co)polymerization of olefinic monomers, the process comprising polymerizing one or more olefinic monomers in the presence of a catalyst comprising a transition metal complex according to claim 1 and optionally a cocatalyst, wherein an activator is present and the molar ratio of the activator to the catalyst is in the range from 0.1 to 10.

5. Transition metal complex suitable for use in a catalyst for olefin polymerization wherein the metal complex comprises at least one —SF$_5$ group attached to a ligand bound to the metal, and wherein the complex is a catalyst or compound having the general structure 12.

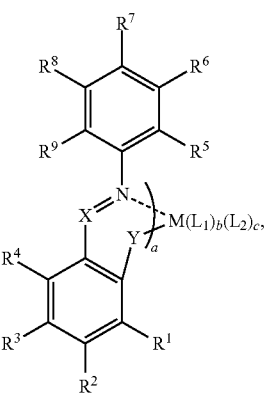

where the substituents and indices have the following meanings:
M is a transition metal from groups 3 to 10 of the periodic table of the elements,
L$_1$ denotes a neutral Lewis base,
L$_2$ denotes halide ions, amide ions (R$^{16}$)$_h$NH$_{2-h}$, h denoting an integer from 0 to 2, C$_1$-C$_6$ alkyl anions, allyl anions, benzyl anions or aryl anions, wherein optionally L$_1$ and L$_2$ are linked by one or more covalent bonds;
X is CR or nitrogen atom (N), wherein R is hydrogen, a C$_1$-C$_6$ alkyl group, a C$_7$-C$_{13}$ aralkyl radical or a C$_6$-C14 aryl group, unsubstituted or substituted by one or more C$_1$-C$_{12}$ alkyl groups, halogens, mono- or polyhalogenated C$_1$-C$_{12}$ alkyl groups, C$_1$-C$_{12}$ alkoxy groups, silyloxy groups OSiR$^{11}$R$^{12}$R$_{13}$; amino groups NR$^{14}$R$^{15}$ or C$_1$-C$_{12}$ thioether groups;
Y is OH group, oxygen, sulfur, N-R$^{10}$ or P-R$^{10}$, provided that when Y is OH group, the bond between Y and M is a coordinate bond;
a is 1 or 2; b=0 or 1; c=0 or 1, and wherein a+b+c equals the valency of the transition metal M and wherein b+c is 1 or 2;
R$^1$ to R$^9$ are independently of one another:
  hydrogen;
  C$_1$-C$_{12}$ alkyl, the alkyl groups being branched or unbranched, optionally C$_1$-C$_{12}$ alkyl being substituted one or more times by identical or different substituents selected from C$_1$-C$_{12}$ alkyl groups, halogens, C$_1$-C$_{12}$ alkoxy groups, C$_1$-C$_{12}$ thioether groups; and C$_7$-C$_{13}$ aralkyl;
  C$_3$-C$_{12}$ cycloalkyl;
  C$_3$-C$_{12}$ cycloalkyl substituted one or more times by identical or different substituents selected from C$_1$-C$_{12}$ alkyl groups, halogens, C$_1$-C$_{12}$ alkoxy groups and C$_1$-C$_{12}$ thioether groups;
  C$_6$-C$_{14}$ aryl, optionally substituted by identical or different substituents selected from one or more C$_1$-C$_{12}$ alkyl groups, halogens, mono- or polyhalogenated C$_1$-C$_{12}$ alkyl groups, C$_1$-C$_{12}$ alkoxy groups, silyloxy groups OSiR$^{11}$R$^{12}$R$^{13}$; amino groups NR$^{14}$R$^{15}$ and C$_1$-C$_{12}$ thioether groups;
  C$_1$-C$_{12}$ alkoxy groups;
  silyloxy groups OSiR$^{11}$R$^{12}$R$^{13}$;
  halogens;
  NO$_2$ groups or amino groups NR$^{14}$R$^{15}$; or
  —SF$_5$ groups or radicals of the formula 14 below, where n is an integer from 1 to 5;

optionally in each case two adjacent radicals $R^1$ to $R^9$ forming with one another a saturated or unsaturated 5- to 8-membered ring;

$R^{10}$ to $R^{16}$ independently of one another being hydrogen, $C_1$-$C_{20}$ alkyl groups, which are optionally substituted with $O(C_1$-$C_6$ alkyl) or $N(C_1$-$C_6$ alkyl)$_2$ groups, $C_3$-$C_{12}$ cycloalkyl groups, $C_7$-$C_{13}$ aralkyl radicals, $C_7$-$C_{13}$ substituted aralkyl radicals, $C_6$-$C_{14}$ aryl groups or substituted $C_6$-$C_{14}$ aryl groups;

wherein at least one of the radicals $R^1$ to $R^9$ is in the form of a —$SF_5$ group or a radical of the formula 14 below

14 where n is an integer from 1 to 5.

6. A catalyst for olefin polymerization, the catalyst comprising at least one transition metal complex according to claim 5.

7. The transition metal complex according to claim 5, wherein the metal M is a transition metal from groups 3-6 of the period table, a is 2, indicating that the transition metal comprises 2 ligands.

8. The transition metal complex according to claim 5, wherein the complex has a structure according to formula 13,

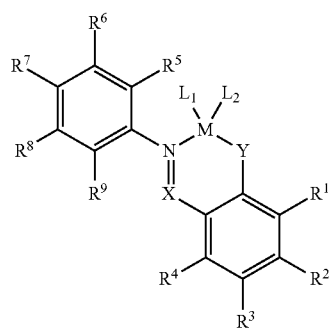

13 and wherein $R^1$-$R^9$, $L_1$, $L_2$, M, X, and Y have the meanings as defined in claim 5.

9. The transition metal complex according to claim 5, wherein Y is an —OH group or oxygen.

10. The transition metal complex according to claim 8, wherein the complex has a structure represented by formula 15

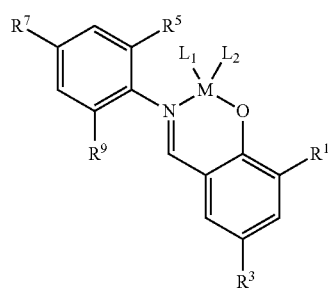

15 wherein $R^5$, $R^7$, and $R^9$ are independently H, methyl, isopropyl, $NO_2$ or

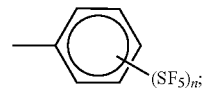

wherein $R^1$ and $R^3$ are independently H, methyl, isopropyl, $NO_2$, I, or

14

where n is an integer from 1 to 5;

with the proviso that at least one of $R^1$, $R^3$, $R^5$, $R^7$ and $R^9$ is a

wherein n is an integer from 1 to 5.

11. The transition metal complex according to claim 5, wherein the —$SF_5$ containing group is a 3,5-dipentafluorosulfanyl phenyl group.

12. The transition metal complex according to claim 8, wherein the complex has a structure represented by any one of formula $13_1$-$13_5$,

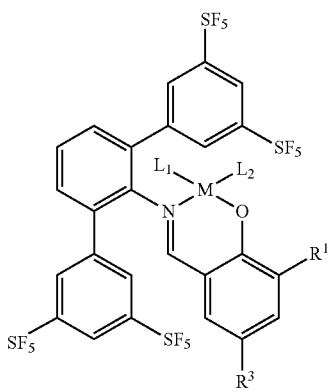

$13_1$

-continued

13₂

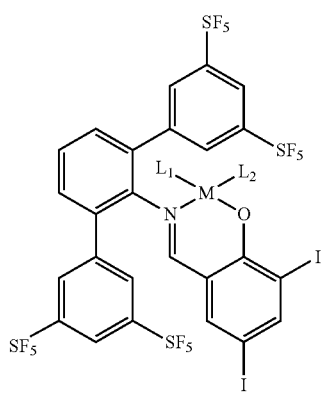

with I = iodine

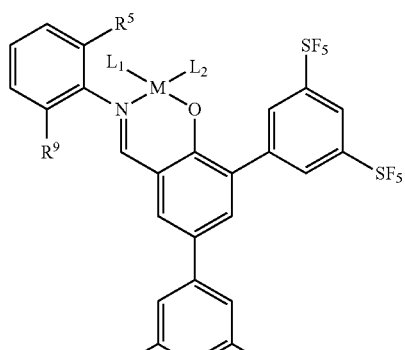

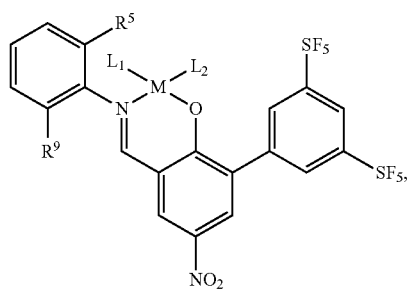

wherein in formula 13₃ and 13₄, $R^5$ and $R^9$ are independently H, —CH₃ or iso-propyl, and

13₅

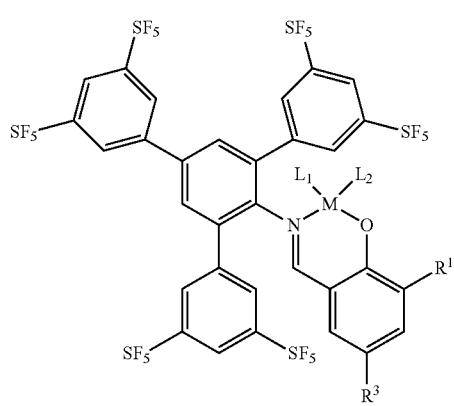

wherein in formula 13₁ and formula 13₅, $R^1$ and $R^3$ are independently H, CH₃, isopropyl, phenyl, naphthyl, anthracenyl, —NO₂, or

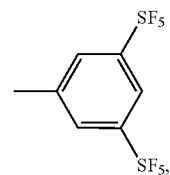

wherein in formula 13₁-13₅, $L_1$ is pyridine or 3,3',3''-phosphanetriyl tris(benzenesulfonic acid) trisodium salt and $L_2$ is a methyl group.

13. The transition metal complex according to claim 5, wherein $L_1$ is pyridine or 3,3',3''-phosphanetriyl tris(benzenesulfonic acid) trisodium salt, $L_2$ is a methyl group, $R^1$ and $R^3$ are independently H, CH₃, isopropyl, phenyl, naphthyl, anthracenyl, NO₂, or

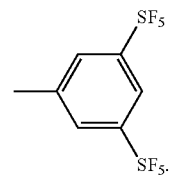

14. The transition metal complex according to claim 5, wherein $L_1$ denotes phosphanes $(R^{19})_x PH_{3-x}$ or amines $(R^{16})_x NH_{3-x}$ with identical or different radicals $R^{16}$, ethers $(R^{16})_2 O$, H₂O, alcohols $(R^{16})OH$, pyridine, pyridine derivatives of the formula $C_5H_{5-x}(R^{16})_x N$, CO, $C_1$-$C_{12}$ alkylnitriles, $C_6$-$C_{14}$ arylnitriles or ethylenically unsaturated double bond systems, and wherein x denotes an integer from 0 to 3, wherein $R^{16}$ has the same meaning as defined in claim 3, and $R^{19}$ is a $C_1$-$C_{20}$ alkyl group, $C_3$-$C_{12}$ cycloalkyl group, $C_7$-$C_{13}$ aralkyl radical, $C_6$-$C_{14}$ aryl group, which alkyl, cycloalkyl, aralkyl and aryl groups are optionally substituted in turn by $O(C_1$-$C_6$ alkyl) or $N(C_1$-$C_6$ alkyl)₂ groups, sulfonated groups or the salts of sulfonated groups.

15. The transition metal complex according to claim 14, wherein $L_1$ denotes phosphanes of the formula $(R^{19})_x PH_{3-x}$, and the phosphanes are selected from the salts of mono, di and tri sulphonated triphenylphosphanes.

16. The transition metal complex according to claim 15, wherein the phosphanes of the formula $(R^{19})_x PH_{3-x}$ are the sodium salts of mono, di or tri sulphonated triphenylphosphanes.

* * * * *